(12) United States Patent
Zheng et al.

(10) Patent No.: US 10,927,934 B2
(45) Date of Patent: Feb. 23, 2021

(54) REDUCER, ELECTRIC VEHICLE DRIVE SYSTEM, CONTROL METHOD FOR ELECTRIC VEHICLE DRIVE SYSTEM, AND ELECTRIC VEHICLE

(71) Applicant: Huawei Technologies Co., Ltd., Shenzhen (CN)

(72) Inventors: Yihong Zheng, Shanghai (CN); Xiaokang Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/891,679

(22) Filed: Jun. 3, 2020

(65) Prior Publication Data

US 2020/0292041 A1 Sep. 17, 2020

Related U.S. Application Data

(63) Continuation of application No. PCT/CN2018/119081, filed on Dec. 4, 2018.

(30) Foreign Application Priority Data

Dec. 4, 2017 (CN) .......................... 201711261452.5

(51) Int. Cl.
*B60K 1/02* (2006.01)
*F16H 37/08* (2006.01)
(Continued)

(52) U.S. Cl.
CPC ........... *F16H 37/0806* (2013.01); *B60K 1/02* (2013.01); *B60K 1/04* (2013.01); *B60K 17/16* (2013.01);
(Continued)

(58) Field of Classification Search
CPC ................. F16H 37/0806; F16H 48/36; F16H 2048/364; B60K 17/16; B60K 1/04; B60K 1/02; B60L 15/20
See application file for complete search history.

(56) References Cited

U.S. PATENT DOCUMENTS 2,874,790 A * 2/1959 Hennessey .............. F16H 48/30
180/6.2
3,971,266 A * 7/1976 Inakura ................ B25J 17/0283
475/9

(Continued)

FOREIGN PATENT DOCUMENTS

CN 101519040 B 12/2012
CN 103587412 A 2/2014
(Continued)

*Primary Examiner* — David J Hlavka
(74) *Attorney, Agent, or Firm* — Conley Rose, P.C.

(57) ABSTRACT

A reducer, an electric vehicle drive system with the reducer, and a control method for the electric vehicle drive system with the reducer comprises, in a reducer, a first countershaft is transmittingly connected to a first input shaft, a second countershaft is transmittingly connected to a second input shaft, and a centralized driving piece is transmittingly connected to a power input end of a differential apparatus. A first transmission assembly and a second transmission assembly are respectively configured to connect or disconnect power transmission between the first countershaft and the centralized driving piece and connect or disconnect transmission assembly power transmission between the second countershaft and the centralized driving piece. A first output shaft and a second output shaft are transmittingly connected to two power output ends of the differential apparatus respectively.

20 Claims, 23 Drawing Sheets

(51) Int. Cl.
  *B60K 1/04*   (2019.01)
  *B60K 17/16*  (2006.01)
  *B60L 15/20*  (2006.01)
  *F16H 48/36*  (2012.01)

(52) U.S. Cl.
  CPC .............. *B60L 15/20* (2013.01); *F16H 48/36* (2013.01); *F16H 2048/364* (2013.01)

(56) References Cited

U.S. PATENT DOCUMENTS

| | | | |
|---|---|---|---|
| 2001/0013258 A1 | 8/2001 | Kobayashi | |
| 2006/0230855 A1 | 10/2006 | Leibbrandt et al. | |
| 2010/0203999 A1* | 8/2010 | Yokoo | F16H 48/30 475/223 |
| 2011/0035130 A1* | 2/2011 | Noguchi | B60W 30/18172 701/89 |
| 2011/0172044 A1* | 7/2011 | Venturi | B60L 50/16 475/5 |
| 2014/0371016 A1 | 12/2014 | Knoblauch | |
| 2018/0283281 A1* | 10/2018 | Veilleux, Jr. | F01D 15/12 |
| 2020/0238807 A1 | 7/2020 | Yu et al. | |

FOREIGN PATENT DOCUMENTS

| | | |
|---|---|---|
| CN | 104141748 A | 11/2014 |
| CN | 203995680 U | 12/2014 |
| CN | 106143105 A | 11/2016 |
| CN | 106427529 A | 2/2017 |
| CN | 205970881 U | 2/2017 |
| CN | 107284213 A | 10/2017 |
| DE | 102011056929 A1 | 6/2013 |
| EP | 0468779 A1 | 1/1992 |
| EP | 1714817 A1 | 10/2006 |
| JP | 2011033077 A | 2/2011 |
| JP | 2015085765 A | 5/2015 |
| KR | 20060108004 A | 10/2006 |

* cited by examiner

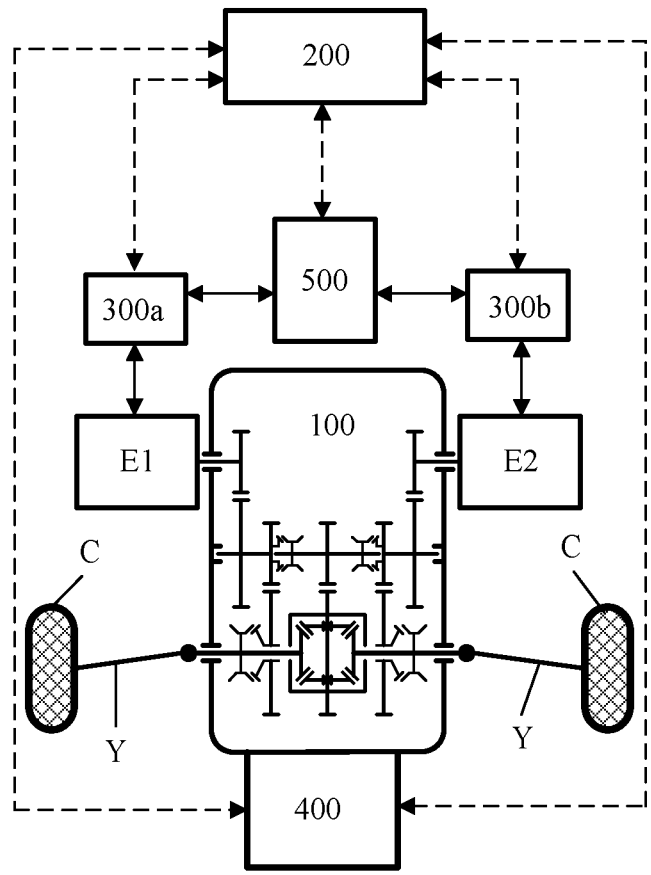

FIG. 7

Obtain a value of a current driving status parameter of a vehicle and an opening degree value of an acceleration pedal, and determine a current driving status of the vehicle based on the value of the current driving status parameter of the vehicle — S1

Control a drive system based on the current driving status of the vehicle and the opening degree value of the acceleration pedal — S2

FIG. 8

REDUCER, ELECTRIC VEHICLE DRIVE SYSTEM, CONTROL METHOD FOR ELECTRIC VEHICLE DRIVE SYSTEM, AND ELECTRIC VEHICLE

CROSS-REFERENCE TO RELATED APPLICATIONS

This application is a continuation of International Patent Application No. PCT/CN2018/119081, filed on Dec. 4, 2018, which claims priority to Chinese Patent Application No. 201711261452.5, filed on Dec. 4, 2017, both of which are hereby incorporated by reference in their entireties.

TECHNICAL FIELD

This disclosure relates to the field of electric vehicle technologies, and in particular, to a reducer, an electric vehicle drive system, a control method for the electric vehicle drive system, and an electric vehicle.

BACKGROUND

An electric vehicle is a vehicle that uses electric energy as a source of energy. A drive system is an important part of the electric vehicle and is used to convert electric energy into mechanical energy and transmit the mechanical energy to wheels to drive the vehicle. Performance of the drive system is directly related to overall performance such as power, economy, stability, and passability of the vehicle. Therefore, providing a high-performance drive system is significant for improving the overall performance of the vehicle.

FIG. 1 is a schematic structural diagram of an electric vehicle drive system in a related technology. As shown in FIG. 1, the drive system includes a first motor E1, a second motor E2, and a reducer. The reducer includes a first input shaft 1a, a second input shaft 1b, a first countershaft 2a, a second countershaft 2b, a first output shaft 3a, a second output shaft 3b, a differential apparatus 4, a centralized driving piece 5, a first input shaft transmission assembly Xa, and a second input shaft transmission assembly Xb. The first input shaft 1a is transmittingly connected to an output shaft of the first motor E1, and the second input shaft 1b is transmittingly connected to an output shaft of the second motor E2. The differential apparatus 4 includes one power input end and two power output ends. The centralized driving piece 5 is connected to the power input end of the differential apparatus 4, the first countershaft 2a is transmittingly connected to one power output end of the differential apparatus 4, and the second countershaft 2b is transmittingly connected to the other power output end of the differential apparatus 4. The first output shaft 3a is transmittingly connected to the first countershaft 2a, and the second output shaft 3b is transmittingly connected to the second countershaft 2b. The first output shaft 3a and the second output shaft 3b are transmittingly connected to a wheel C on a left side and a wheel C on a right side of the vehicle respectively. The first input shaft transmission assembly Xa is configured to connect power transmission between the first input shaft 1a and the first countershaft 2a, or connect power transmission between the first input shaft 1a and the centralized driving piece 5, or disconnect power transmission of the first input shaft 1a. The second input shaft transmission assembly Xb is configured to connect power transmission between the second input shaft 1b and the second countershaft 2b, or connect power transmission between the second input shaft 1b and the centralized driving piece 5, or disconnect power transmission of the second input shaft 1b.

At least the following problems exist in the foregoing related technology.

When a wheel on one side of the vehicle idles or slips, only a motor corresponding to a wheel that does not idle or slip drives the wheel that does not idle or slip, to ensure driving of the vehicle. However, power provided by one motor is limited, and a problem of insufficient power occurs. For example, when the wheel C transmittingly connected to the second output shaft 3b idles or slips, power transmission between the first output shaft 1a and the first countershaft 2a may be connected, to transmit power of the first motor E1 to the first output shaft 3a through the first output shaft 1a and the first countershaft 2a in order to drive the wheel C transmittingly connected to the first output shaft 3a to rotate. In this case, power transmission between the first input shaft 1a and the centralized driving piece 5 is disconnected. Even if power transmission between the second input shaft 2a and the centralized driving piece 5 is connected, power of the second motor E2 can be transmitted to the differential apparatus 4 only through the centralized driving piece 5, and then is transmitted to the second output shaft 3b through the differential apparatus 4.

SUMMARY

Embodiments of this disclosure provide a reducer, an electric vehicle drive system, a control method for the electric vehicle drive system, and an electric vehicle, to resolve a problem of insufficient power in a driving situation that a wheel on one side of a vehicle idles or slips in the foregoing related technology.

Specifically, the following technical solutions are included.

According to a first aspect, an embodiment of this disclosure provides a reducer. The reducer includes a first input shaft, a second input shaft, a first countershaft, a second countershaft, a first output shaft, a second output shaft, a centralized driving piece, and a differential apparatus, where the differential apparatus includes one power input end and two power output ends, and the centralized driving piece is transmittingly connected to the power input end of the differential apparatus, where the first countershaft is transmittingly connected to the first input shaft, and the second countershaft is transmittingly connected to the second input shaft, and the first output shaft and the second output shaft are transmittingly connected to the two power output ends of the differential apparatus respectively, and the reducer further includes a first transmission assembly, a second transmission assembly, a third transmission assembly, and a fourth transmission assembly, where the first transmission assembly is configured to connect or disconnect power transmission between the first countershaft and the centralized driving piece, and the second transmission assembly is configured to connect or disconnect power transmission between the second countershaft and the centralized driving piece, and the third transmission assembly is configured to connect or disconnect power transmission between the first countershaft and the first output shaft, and the fourth transmission assembly is configured to connect or disconnect power transmission between the second countershaft and the second output shaft.

The reducer provided in this embodiment of this disclosure is applied to the electric vehicle. The first input shaft is transmittingly connected to an output shaft of the first motor, the second input shaft is transmittingly connected to an output shaft of the second motor, the first output shaft is transmittingly connected to a wheel on one side of the vehicle, and the second output shaft is transmittingly connected to a wheel on the other side of the vehicle. Therefore, when a wheel on one side of the vehicle idles or slips, the first motor and the second motor can simultaneously transmit power to a wheel that does not idle or slip, thereby improving power of the vehicle in a driving situation that a wheel on one side idles or slips. For example, when a wheel transmittingly connected to the second output shaft idles or slips, power transmission between the first countershaft and the centralized driving piece is connected, power transmission between the second countershaft and the centralized driving piece is connected, and power transmission between the first countershaft and the first output shaft is connected. Power output by the first motor is successively transmitted, through the first input shaft, the first countershaft, and the first output shaft, to a wheel transmittingly connected to the first output shaft. The differential apparatus is out of differential function, and most of power output by the second motor is also transmitted, through the second input shaft, the second countershaft, the second transmission assembly, the centralized driving piece, the first transmission assembly, the first countershaft, and the first output shaft, to a wheel transmittingly connected to the first output shaft. Therefore, the wheel transmittingly connected to the first output shaft is driven by both power output by the first motor and power output by the second motor.

In a possible design, the centralized driving piece includes a centralized driving shaft, the centralized driving shaft is located between the first countershaft and the second countershaft, and the first countershaft, the centralized driving shaft, and the second countershaft are coaxial.

In another possible design, the first transmission assembly includes a first countershaft driving gear, sleeved on the first countershaft and transmittingly connected to the first countershaft, a first countershaft synchronizer, sleeved at one end of the centralized driving shaft and transmittingly connected to the centralized driving shaft, and a first countershaft joint gear ring, fastened on an end face that is of the first countershaft driving gear and that is close to the first countershaft synchronizer, where the first countershaft synchronizer has a shift sleeve slidable along a shaft direction and engageable with the first countershaft joint gear ring, and the second transmission assembly includes a second countershaft driving gear, sleeved on the second countershaft and transmittingly connected to the second countershaft, a second countershaft synchronizer, sleeved at the other end of the centralized driving shaft and transmittingly connected to the centralized driving shaft, and a second countershaft joint gear ring, fastened on an end face that is of the second countershaft driving gear and that is close to the second countershaft synchronizer, where the second countershaft synchronizer has a shift sleeve slidable along a shaft direction and engageable with the second countershaft joint gear ring.

The shift sleeve of the first countershaft synchronizer engages with or is separated from the first countershaft joint gear ring fastened on the first countershaft driving gear, to implement connection or disconnection of power transmission between the first countershaft and the centralized driving shaft. The shift sleeve of the second countershaft synchronizer engages with or is separated from the second countershaft joint gear ring fastened on the second countershaft driving gear, to implement connection or disconnection of power transmission between the second countershaft and the centralized driving shaft.

In another possible design, the centralized driving piece further includes a centralized driving gear, and the centralized driving gear is sleeved on the centralized driving shaft, and is transmittingly connected to the centralized driving shaft, the first transmission assembly includes a first countershaft driving gear, sleeved on the first countershaft and transmittingly connected to the first countershaft, a first countershaft synchronizer, sleeved on the first countershaft and transmittingly connected to the first countershaft, and a first countershaft joint gear ring, fastened on one end face of the centralized driving gear, where the first countershaft synchronizer has a shift sleeve slidable along a shaft direction and engageable with the first countershaft joint gear ring, and the second transmission assembly includes a second countershaft driving gear, sleeved on the second countershaft and transmittingly connected to the second countershaft, a second countershaft synchronizer, sleeved on the second countershaft and transmittingly connected to the second countershaft, and a second countershaft joint gear ring, fastened on the other end face of the centralized driving gear, where the second countershaft synchronizer has a shift sleeve slidable along a shaft direction and engageable with the second countershaft joint gear ring.

The shift sleeve of the first countershaft synchronizer engages with or is separated from the first countershaft joint gear ring fastened on the centralized driving gear, to implement connection or disconnection of power transmission between the first countershaft and the centralized driving gear. The shift sleeve of the second countershaft synchronizer engages with or is separated from the second countershaft joint gear ring fastened on the centralized driving gear, to implement connection or disconnection of power transmission between the second countershaft and the centralized driving gear.

In another possible design, the third transmission assembly includes a first output shaft gear, sleeved on the first output shaft and engaging with the first countershaft driving gear, a first output shaft synchronizer, sleeved on the first output shaft and transmittingly connected to the first output shaft, and a first output shaft joint gear ring, fastened on an end face that is of the first output shaft gear and that is close to the first output shaft synchronizer, where the first output shaft synchronizer has a shift sleeve slidable along a shaft direction and engageable with the first output shaft joint gear ring, and the fourth transmission assembly includes a second output shaft gear, sleeved on the second output shaft and engaging with the second countershaft driving gear, a second output shaft synchronizer, sleeved on the second output shaft and transmittingly connected to the second output shaft, and a second output shaft joint gear ring, fastened on an end face that is of the second output shaft gear and that is close to the second output shaft synchronizer, where the second output shaft synchronizer has a shift sleeve slidable along a shaft direction and engageable with the second output shaft joint gear ring.

The shift sleeve of the first output shaft synchronizer engages with or is separated from the first output shaft joint gear ring fastened on the first output shaft gear, to implement connection or disconnection of power transmission between the first countershaft and the first output shaft. The shift sleeve of the second output shaft synchronizer engages with or separated from the second output shaft gear, to implement connection or disconnection of power transmission between the second countershaft and the second output shaft.

In another possible design, the first countershaft synchronizer, the second countershaft synchronizer, the first output shaft synchronizer, and the second output shaft synchronizer are single-sided synchronizers.

In another possible design, the reducer further includes a first input shaft gear, sleeved on the first input shaft and transmittingly connected to the first input shaft, a first countershaft driven gear, sleeved on the first countershaft, transmittingly connected to the first countershaft, and engaging with the first input shaft gear, a second input shaft gear, sleeved on the second input shaft and transmittingly connected to the second input shaft, and a second countershaft driven gear, sleeved on the second countershaft, transmittingly connected to the second countershaft, and engaging with the second input shaft gear.

The first input shaft gear and the first countershaft driven gear are engaged to implement power transmission between the first input shaft and the first countershaft. The second input shaft gear and the second countershaft driven gear are engaged to implement power transmission between the second input shaft and the second countershaft.

In another possible design, the differential apparatus includes a housing, a main transmission gear, fastened on an outer side of the housing and transmittingly connected to the centralized driving piece, a planetary gear shaft, fastened inside the housing and perpendicular to a shaft of the main transmission gear, a first planetary gear, sleeved on the planetary gear shaft, a second planetary gear, sleeved on the planetary gear shaft and disposed opposite to the first planetary gear, a first side gear, located between the first planetary gear and the second planetary gear, and engaging with both the first planetary gear and the second planetary gear, and a second side gear, located between the first planetary gear and the second planetary gear, disposed opposite to the first side gear, and engaging with both the first planetary gear and the second planetary gear, where the first output shaft passes through the housing and is transmittingly connected to the first side gear drive, and the second output shaft passes through the housing and is transmittingly connected to the second side gear.

According to a second aspect, an embodiment of this disclosure provides an electric vehicle drive system. The electric vehicle drive system includes a first motor and a second motor, and further includes the reducer according to the first aspect of this embodiment of this disclosure, where the first input shaft is transmittingly connected to an output shaft of the first motor, and the second input shaft is transmittingly connected to an output shaft of the second motor.

In a possible design, a drive mode of the drive system includes a single-motor centralized drive mode, and in the single-motor centralized drive mode, the first motor is in a driving state, the second motor is in a shutdown state, power transmission between the first countershaft and the centralized driving piece is connected, power transmission between the second countershaft and the centralized driving piece is disconnected, power transmission between the first countershaft and the first output shaft is disconnected, and power transmission between the second countershaft and the second output shaft is disconnected, or the first motor is in a shutdown state, the second motor is in a driving state, power transmission between the first countershaft and the centralized driving piece is disconnected, power transmission between the second countershaft and the centralized driving piece is connected, power transmission between the first countershaft and the first output shaft is disconnected, and power transmission between the second countershaft and the second output shaft is disconnected.

In the single-motor centralized drive mode, one motor drives a wheel on a left side and a wheel on a right side of the vehicle simultaneously, to evenly distribute power to the wheel on the left side and the wheel on the right side. This drive mode is applicable to a driving situation that a single-side motor is faulty, or a vehicle is stable driving with a comparatively low requirement for power and torque. This helps improve working efficiency of the motor and economy of the vehicle.

In another possible design, a drive mode of the drive system includes a dual-motor centralized drive mode, and in the dual-motor centralized drive mode, the first motor is in a driving state, the second motor is in a driving state, power transmission between the first countershaft and the centralized driving piece is connected, power transmission between the second countershaft and the centralized driving piece is connected, power transmission between the first countershaft and the first output shaft is disconnected, and power transmission between the second countershaft and the second output shaft is disconnected.

In the dual-motor centralized drive mode, two motors simultaneously drive a wheel on a left side and a wheel on a right side of the vehicle, to evenly distribute power to the wheel on the left side and the wheel on the right side. This drive mode is applicable to a driving situation with a comparatively high requirement for driving torque such as abrupt acceleration and climbing. This can ensure sufficient power of the vehicle.

In another possible design, a drive mode of the drive system includes a dual-motor distributed drive mode, and in the dual-motor distributed drive mode, the first motor is in a driving state, the second motor is in a driving state, power transmission between the first countershaft and the centralized driving piece is disconnected, power transmission between the second countershaft and the centralized driving piece is disconnected, power transmission between the first countershaft and the first output shaft is connected, and power transmission between the second countershaft and the second output shaft is connected.

In the dual-motor distributed drive mode, two motors respectively drive a wheel on a left side and a wheel on a right side of the vehicle. This drive mode is applicable to a driving situation with a stability control requirement such as sharp turning, low road adhesion, and high-speed driving, to ensure stable driving of the vehicle.

In another possible design, a drive mode of the drive system includes a single-motor single-side drive mode, and in the single-motor single-side drive mode, the first motor is in a driving state, the second motor is in a shutdown state, power transmission between the first countershaft and the centralized driving piece is disconnected, power transmission between the second countershaft and the centralized driving piece is disconnected, power transmission between the first countershaft and the first output shaft is connected, and power transmission between the second countershaft and the second output shaft is disconnected, or the first motor is in a shutdown state, the second motor is in a driving state, power transmission between the first countershaft and the centralized driving piece is disconnected, power transmission between the second countershaft and the centralized driving piece is disconnected, power transmission between the first countershaft and the first output shaft is disconnected, and power transmission between the second countershaft and the second output shaft is connected.

In the single-motor single-side drive mode, one motor independently drives a wheel on a same side as the motor. This drive mode is applicable to a driving situation that a wheel on one side idles or slips with a comparatively low requirement for driving torque.

In another possible design, a drive mode of the drive system includes a first wheel lock-up dual-motor drive mode, and in the first wheel lock-up dual-motor drive mode, the first motor is in a driving state, the second motor is in a driving state, power transmission between the first countershaft and the centralized driving piece is connected, power transmission between the second countershaft and the centralized driving piece is connected, power transmission between the first countershaft and the first output shaft is connected, and power transmission between the second countershaft and the second output shaft is disconnected, or the first motor is in a driving state, the second motor is in a driving state, power transmission between the first countershaft and the centralized driving piece is connected, power transmission between the second countershaft and the centralized driving piece is connected, power transmission between the first countershaft and the first output shaft is disconnected, and power transmission between the second countershaft and the second output shaft is connected.

A drive mode of the drive system includes a second wheel lock-up dual-motor drive mode, and in the second wheel lock-up dual-motor drive mode, the first motor is in a driving state, the second motor is in a driving state, power transmission between the first countershaft and the centralized driving piece is connected, power transmission between the second countershaft and the centralized driving piece is connected, power transmission between the first countershaft and the first output shaft is connected, and power transmission between the second countershaft and the second output shaft is connected.

In the foregoing two wheel lock-up dual-motor drive modes, two motors jointly drive a wheel on one side, to lock a left side and a right side of the vehicle as a whole. The differential apparatus is out of differential function, and power is mainly transmitted to a wheel on one side that does not idle or slip. The drive modes are applicable to a driving situation that a wheel on one side idles or slips with a comparatively high requirement for driving torque.

In another possible design, a drive mode of the drive system includes a wheel lock-up signal-motor drive mode, and the first motor is in a shutdown state, the second motor is in a driving state, power transmission between the first countershaft and the centralized driving piece is connected, power transmission between the second countershaft and the centralized driving piece is connected, power transmission between the first countershaft and the first output shaft is connected, and power transmission between the second countershaft and the second output shaft is disconnected (or connected), or, the first motor is in a driving state, the second motor is in a shutdown state, power transmission between the first countershaft and the centralized driving piece is connected, power transmission between the second countershaft and the centralized driving piece is connected, power transmission between the first countershaft and the first output shaft is disconnected (connected), and power transmission between the second countershaft and the second output shaft is connected.

The wheel lock-up single-motor drive mode is applicable to a driving situation that a wheel on one side idles or slips and a motor on the other side is faulty. A motor on one side that idling or slipping does not occur is used to drive a wheel on one side that does not idle or slip.

In another possible design, the drive system further includes a vehicle controller, a reducer controller, electrically connected to the vehicle controller, a first motor controller, electrically connected to the first motor and the vehicle controller, a second motor controller, electrically connected to the second motor and the vehicle controller, and a power battery, electrically connected to the first motor controller, the second motor controller, and the vehicle controller.

The reducer controller is configured to control power transmission between the first countershaft and the centralized driving piece to be connected or disconnected, power transmission between the second countershaft and the centralized driving piece to be connected or disconnected, power transmission between the first countershaft and the first output shaft to be connected or disconnected, and power transmission between the second countershaft and the second output shaft to be connected or disconnected. The power battery is configured to provide electric energy for the first motor and the second motor. The first motor controller and the second motor controller are respectively configured to control the first motor and the second motor to shut down or output torque, and are further configured to perform conversion between a direct current and an alternating current. The vehicle controller is a coordination control center of the vehicle, and is configured to send a control instruction to the reducer controller, the first motor controller, the second motor controller, and the power battery based on a driving situation of the vehicle.

According to a third aspect, an embodiment of this disclosure provides a control method for an electric vehicle drive system. The control method is applied to the electric vehicle drive system according to the second aspect of this embodiment of this disclosure, and includes the following steps obtaining a value of a current driving status parameter of a vehicle and an opening degree value of an acceleration pedal, and determining a current driving status of the vehicle based on the value of the current driving status parameter of the vehicle, where the driving status parameter includes at least a yaw angular velocity, acceleration, a steering wheel rotation angle, a wheel rotational speed, a first motor status parameter, and a second motor status parameter, and controlling the drive system based on the current driving status of the vehicle and the opening degree value of the acceleration pedal.

It may be understood that, the controlling the drive system includes but is not limited to controlling power transmission between the first countershaft and the centralized driving piece to be connected or to be disconnected, power transmission between the second countershaft and the centralized driving piece to be connected or to be disconnected, power transmission between the first countershaft and the first output shaft to be connected or to be disconnected, power transmission between the second countershaft and the second output shaft to be connected or to be disconnected, the first motor to output torque or to be shut down, and the second motor to output torque or to be shutdown.

In a possible design, when the current driving status of the vehicle is stable driving, no wheels idle or slip, and the opening degree value of the acceleration pedal is less than or equal to a preset opening degree value, or when the current driving status of the vehicle is that the first motor or the second motor is faulty, but no wheels idle or slip, the control method includes controlling power transmission between the first countershaft and the centralized driving piece to be connected, power transmission between the second countershaft and the centralized driving piece to be disconnected, power transmission between the first countershaft and the first output shaft to be disconnected, power transmission between the second countershaft and the second output shaft to be disconnected, the first motor to output torque, and the second motor to be shut down, or controlling power transmission between the first countershaft and the centralized driving piece to be disconnected, power transmission between the second countershaft and the centralized driving piece to be connected, power transmission between the first countershaft and the first output shaft to be disconnected, power transmission between the second countershaft and the second output shaft to be disconnected, the first motor to be shut down, and the second motor to output torque.

In another possible design, when the current driving status of the vehicle is that the first motor and the second motor are not faulty and are stable driving, no wheels idle or slip, and the opening degree value of the acceleration pedal is greater than a preset opening degree value, the control method includes controlling power transmission between the first countershaft and the centralized driving piece to be connected, power transmission between the second countershaft and the centralized driving piece to be connected, power transmission between the first countershaft and the first output shaft to be disconnected, power transmission between the second countershaft and the second output shaft to be disconnected, the first motor to output torque, and the second motor to output torque.

In another possible design, when the current driving status of the vehicle is that the first motor and the second motor are not faulty, no wheels idle or slip, but the vehicle is unstable, the control method includes controlling power transmission between the first countershaft and the centralized driving piece to be disconnected, power transmission between the second countershaft and the centralized driving piece to be disconnected, power transmission between the first countershaft and the first output shaft to be connected, power transmission between the second countershaft and the second output shaft to be connected, the first motor to output torque, and the second motor to output torque.

In another possible design, when the current driving status of the vehicle is that the first motor and the second motor are not faulty, but a wheel on one side idles or slips, and the opening degree value of the acceleration pedal is less than or equal to a preset opening degree value, the control method includes controlling power transmission between the first countershaft and the centralized driving piece to be disconnected, power transmission between the second countershaft and the centralized driving piece to be disconnected, power transmission between the first countershaft and the first output shaft to be connected, power transmission between the second countershaft and the second output shaft to be disconnected, the first motor to output torque, and the second motor to be shut down, or controlling power transmission between the first countershaft and the centralized driving piece to be disconnected, power transmission between the second countershaft and the centralized driving piece to be disconnected, power transmission between the first countershaft and the first output shaft to be disconnected, power transmission between the second countershaft and the second output shaft to be connected, the first motor to be shut down, and the second motor to output torque.

In another possible design, when the current driving status of the vehicle is that the first motor and the second motor are not faulty, but a wheel on one side idles or slips, and the opening degree value of the acceleration pedal is greater than a preset opening degree value, the control method includes controlling power transmission between the first countershaft and the centralized driving piece to be connected, power transmission between the second countershaft and the centralized driving piece to be connected, power transmission between the first countershaft and the first output shaft to be connected, power transmission between the second countershaft and the second output shaft to be disconnected, the first motor to output torque, and the second motor to output torque, or controlling power transmission between the first countershaft and the centralized driving piece to be connected, power transmission between the second countershaft and the centralized driving piece to be connected, power transmission between the first countershaft and the first output shaft to be disconnected, power transmission between the second countershaft and the second output shaft to be connected, the first motor to output torque, and the second motor to output torque, or controlling power transmission between the first countershaft and the centralized driving piece to be connected, power transmission between the second countershaft and the centralized driving piece to be connected, power transmission between the first countershaft and the first output shaft to be connected, power transmission between the second countershaft and the second output shaft to be connected, the first motor to output torque, and the second motor to output torque.

In another possible design, the control method further includes, after the vehicle is powered on, controlling the first motor, the second motor, power transmission between the first countershaft and the centralized driving piece, power transmission between the second countershaft and the centralized driving piece, power transmission between the first countershaft and the first output shaft, and power transmission between the second countershaft and the second output shaft all to be in a preset status.

According to a fourth aspect, an embodiment of this disclosure provides an electric vehicle. The electric vehicle includes the electric vehicle drive system according to the second aspect of this disclosure.

In a possible design, the electric vehicle includes a front-drive system or a rear-drive system, and the front-drive system or the rear-drive system is a drive system of the electric vehicle.

In another possible design, the electric vehicle includes a front-drive system and a rear-drive system, and at least one of the front-drive system and the rear-drive system is a drive system of the electric vehicle.

BRIEF DESCRIPTION OF DRAWINGS

FIG. 7 is a schematic structural diagram of another electric vehicle drive system according to an embodiment of this disclosure.

FIG. 8 is a flowchart of a control method for an electric vehicle drive system according to an embodiment of this disclosure.

A direction of an arrow in any of FIG. 6A to FIG. 6G represents a power transmission direction, and a thickness of the arrow represents a power transmission amount.

Figure 11A:
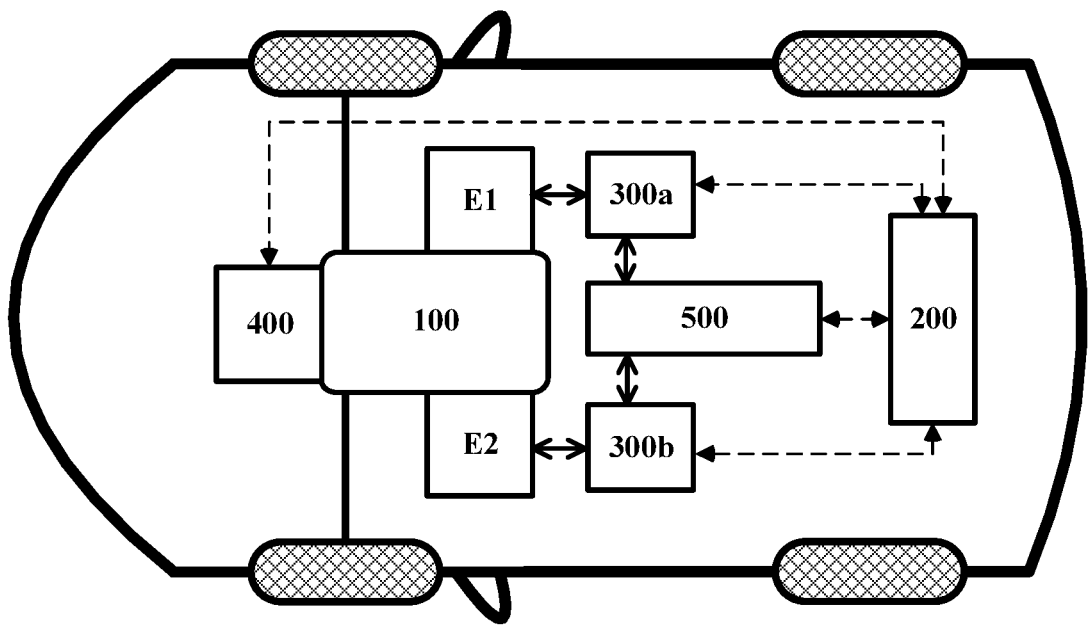
FIG. 11A is a schematic structural diagram of a front-wheel-driven electric vehicle according to an embodiment of this disclosure.
Figure 11B:
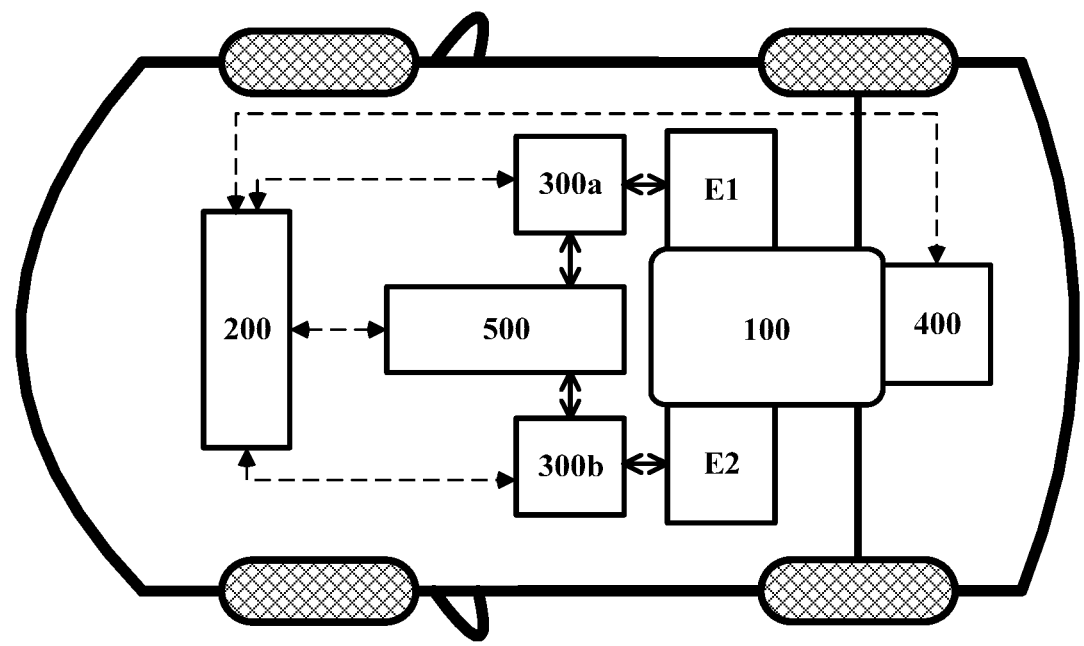
FIG. 11B is a schematic structural diagram of a rear-wheel-driven electric vehicle according to an embodiment of this disclosure.
Figure 11C:
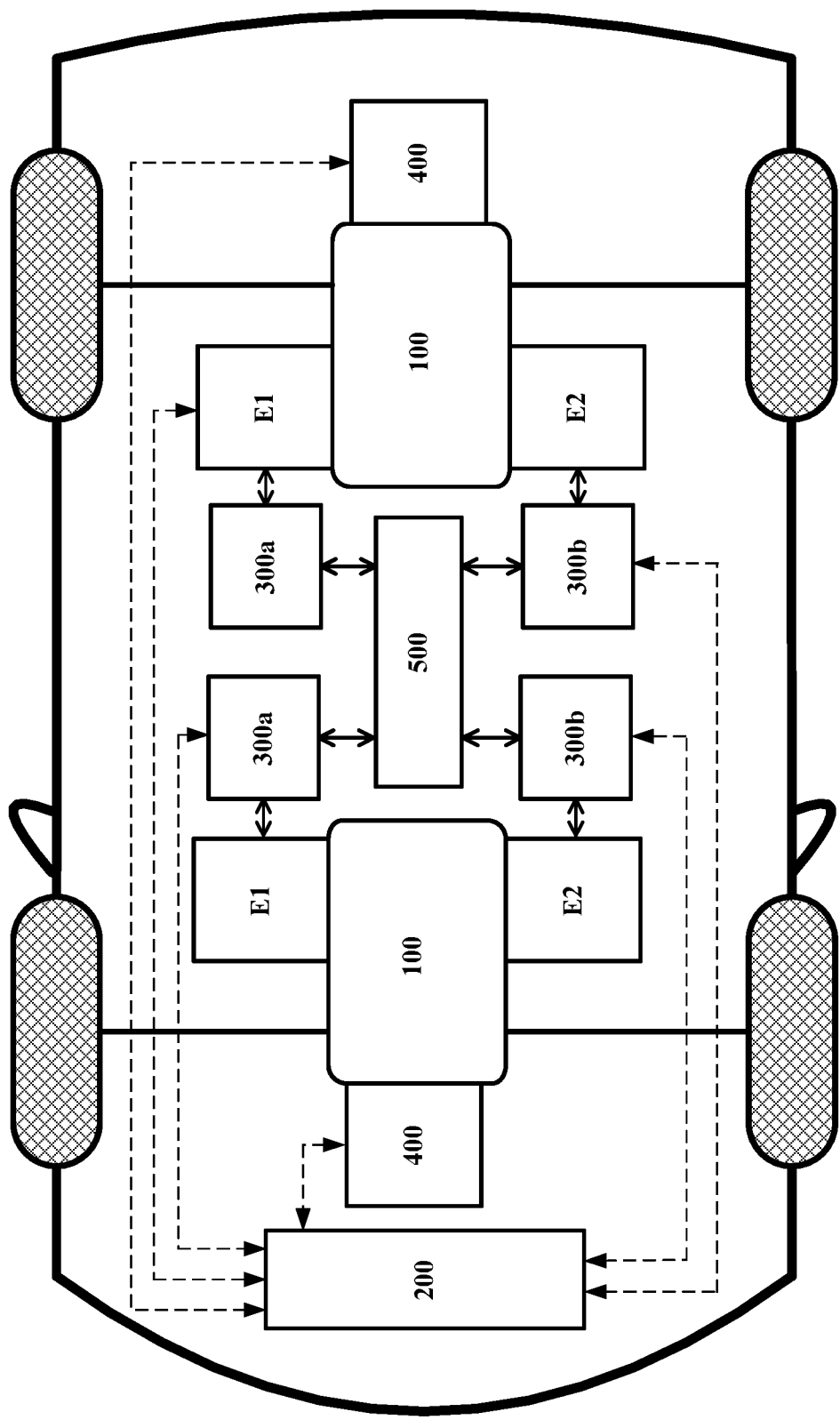
FIG. 11C is a schematic structural diagram of a four-wheel-driven electric vehicle according to an embodiment of this disclosure.

A solid arrow in any of FIG. 11A to FIG. 11C represents electric energy transmission, and a dotted arrow in any of FIG. 11A to FIG. 11C represents signal transmission.

DESCRIPTION OF EMBODIMENTS

To make the technical solutions and advantages of this disclosure clearer, the following further describes the implementations of this disclosure in detail with reference to the accompanying drawings. Unless otherwise defined, all technical terms used in the embodiments of this disclosure have a same meaning as that generally understood by a person skilled in the art.

In a driving process of an electric vehicle, there are generally requirements for performance such as power, economy, stability, and passability. A drive system is an important part of the electric vehicle and is closely related to overall performance of the vehicle. For the power requirement, when a driver heavily stamps on an acceleration pedal (in other words, an opening degree of the acceleration pedal is comparatively large), it is expected that the drive system can output comparatively large torque and comparatively large power. For the economy requirement, in a driving situation of small average driving torque and low average power, it is expected that a motor can work in a high efficiency range. For the stability requirement, in a driving situation such as wet sliding road and sharp turning, it is expected that driving torque of a wheel on a left side and driving torque of a wheel on a right side of the vehicle can be independently adjusted. For the passability (also referred to as an off-road capability) requirement, in a driving situation that a single-side wheel idles or slips, it is expected that torque and power output by a motor can flow to a wheel on one side that does not idle or slip.

At present, most of drive systems of electric vehicles are dual-motor drive systems, and power of two motors is transmitted to wheels on two sides of the vehicle through a reducer. For the dual-motor drive system, when the vehicle has the power requirement, it is expected that power output by the two motors can be centralized to drive the wheels on the two sides of the vehicle. When the vehicle has the stability requirement, it is expected that power output by the two motors can be respectively transmitted to the wheels on the two sides of the vehicle. When a single-side motor is faulty or the vehicle has the economy requirement, it is expected that the wheels on the two sides of the vehicle are driven using only one motor. However, when a wheel on one side of the vehicle idles or slips, it is expected that a wheel on one side that does not idle or slip can be driven using only one motor or two motors together based on the power requirement.

Figure 1:
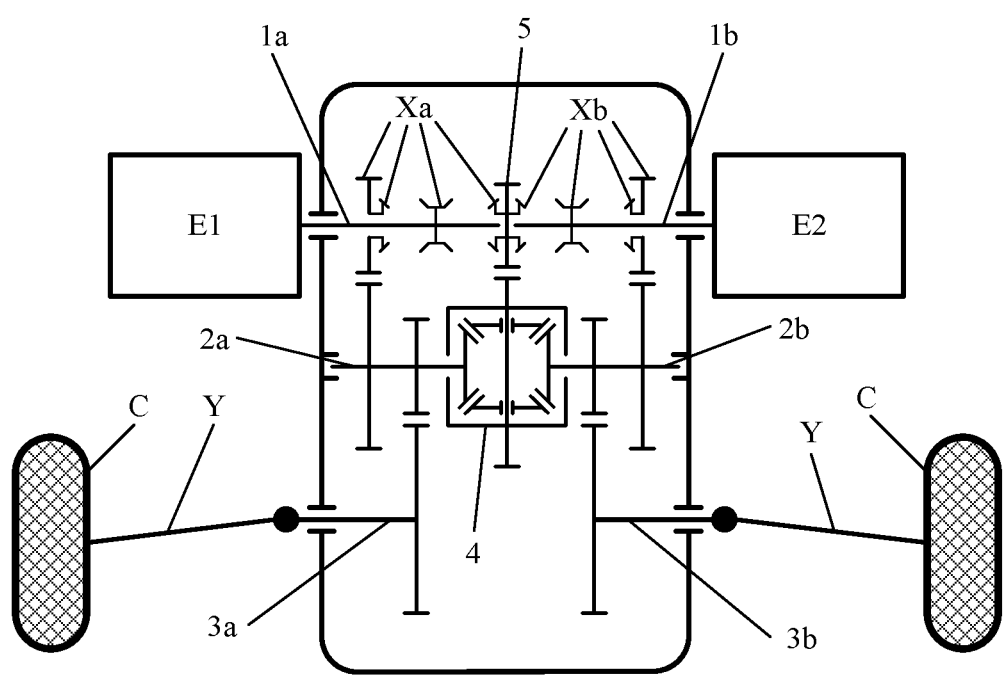
FIG. 1 is a schematic structural diagram of an electric vehicle drive system in a related technology.

However, a drive system shown in FIG. 1 and provided in the related technology can meet only requirements for power, economy, and stability of the vehicle. When the vehicle is in a driving situation that a wheel on one side idles or slips, a problem of insufficient power occurs.

Based on the foregoing description, in the embodiments of this disclosure, the reducer of the drive system is optimized and improved, to improve power of the vehicle in a driving situation that a wheel on one side idles or slips on a premise that an electric vehicle drive system meets requirements for power, economy, and stability of the vehicle, thereby improving passability of the vehicle.

Before the technical solutions in the embodiments of this disclosure are described in detail, reference numerals in the accompanying drawings in the embodiments of this disclosure are first described.

100—reducer
1a—first input shaft; 1b—second input shaft
2a—first countershaft; 2b—second countershaft
3a—first output shaft; 3b—second output shaft
4—differential apparatus
41—housing
42—main transmission gear
43—planetary gear shaft
44a—first planetary gear; 44b—second planetary gear
45a—first side gear; 45b—second side gear
5—centralized driving device
51—centralized driving shaft; 52—centralized driving gear
X1—first transmission assembly; X2—second transmission assembly
61a—first countershaft main transmission gear; 61b—second countershaft main transmission gear
62a—first countershaft joint gear ring; 62b—second countershaft joint gear ring 7a—first countershaft synchronizer; 7b—second countershaft synchronizer X3—third transmission assembly; X4—fourth transmission assembly 81a—first output shaft gear; 81b—second output shaft gear 82a—first output shaft joint gear ring; 82b—second output shaft joint gear ring 9a—first output shaft synchronizer; 9b—second output shaft synchronizer 10a—first input shaft gear; 10b—second input shaft gear 11a—first countershaft driven gear; 11b—second countershaft driven gear 12—cover E1—first motor; E2—second motor C—wheel Y—wheel halfshaft 200—vehicle controller 300a—first motor controller; 300b—second motor controller 400—reducer controller 500—power battery The following describes in detail the reducer provided in the embodiments of this disclosure.

Figure 2:
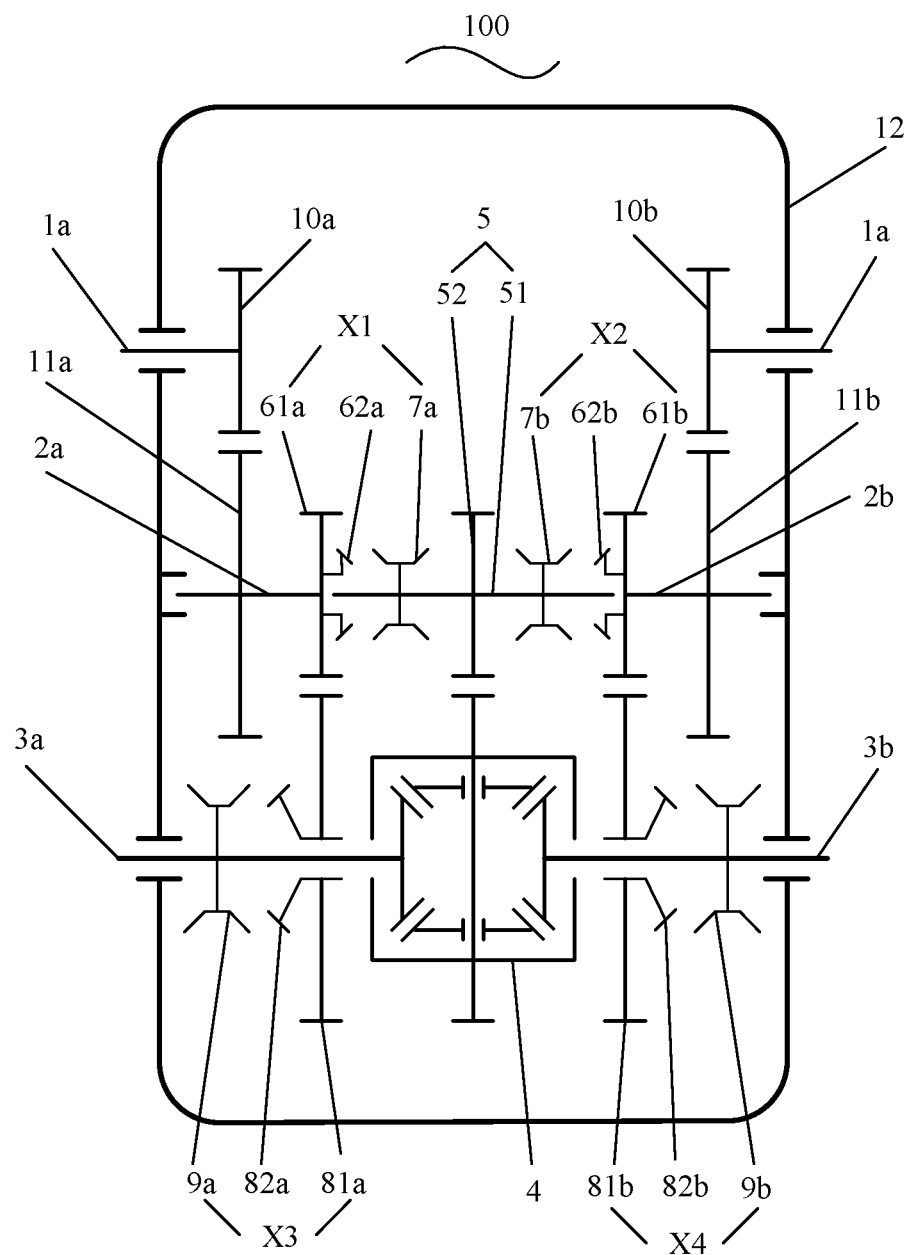
FIG. 2 is a schematic structural diagram of a reducer according to an embodiment of this disclosure.

FIG. 2 is a schematic structural diagram of a reducer 100 according to an embodiment of this disclosure. As shown in FIG. 2, the reducer 100 includes a first input shaft 1a, a second input shaft 1b, a first countershaft 2a, a second countershaft 2b, a first output shaft 3a, a second output shaft 3b, a differential apparatus 4, a centralized driving piece 5, a first transmission assembly X1, a second transmission assembly X2, a third transmission assembly X3, and a fourth transmission assembly X4.

The differential apparatus 4 includes one power input end and two power output ends.

The first countershaft 2a is transmittingly connected to the first input shaft 1a, and the second countershaft 2b is transmittingly connected to the second input shaft 1b. The centralized driving piece 5 is transmittingly connected to the power input end of the differential apparatus 4.

The first output shaft 3a and the second output shaft 3b are transmittingly connected to the two power output ends of the differential apparatus 4 respectively.

The first transmission assembly X1 is configured to connect or disconnect power transmission between the first countershaft 2a and the centralized driving piece 5, and the power transmission assembly X2 is configured to connect or disconnect power transmission between the second countershaft 2b and the centralized driving piece 5.

The third transmission assembly X3 is configured to connect or disconnect power transmission between the first countershaft 2a and the first output shaft 3a, and the fourth transmission assembly X4 is configured to connect or disconnect power transmission between the second countershaft 2b and the second output shaft 3b.

In the reducer 100, the first input shaft 1a and the second input shaft 1b are respectively configured to transmittingly connect to an output shaft of a first motor E1 and an output shaft of a second motor E2, and power output by the first motor E1 and power output by the second motor E2 are respectively transmitted to the reducer 100 through the first input shaft 1a and the second input shaft 1b.

The first output shaft 3a and the second output shaft 3b are respectively configured to transmittingly connect to a wheel C on a left side and a wheel C on a right side of a vehicle, to transmit power to the wheels C in order to drive the vehicle.

The differential apparatus 4 may increase, using a differential function, a rotational speed of an outer wheel C that is less subject to resistance when the vehicle turns in order to ensure that the vehicle turns smoothly.

A power transmission path inside the reducer 100 may be controlled using the first transmission assembly X1, the second transmission assembly X2, the third transmission assembly X3, and the fourth transmission assembly X4. When power transmission between the first countershaft 2a and the centralized driving piece 5 is connected, power transmission between the second countershaft 2b and the centralized driving piece 5 is connected, and power transmission between the first countershaft 2a and the first output 3a is connected, power output by the first motor E1 is successively transmitted, through the first input shaft 1a, the first countershaft 2a, and the first output shaft 3a, to the wheel C transmittingly connected to the first output shaft 3a. At the same time, the differential apparatus 4 is out of function, and most of power output by the second motor E2 is also transmitted, through the second input shaft 1b, the second countershaft 2b, the second transmission assembly X2, the centralized driving piece 5, the first transmission assembly X1, the first countershaft 2a, and the first output shaft 3a, to the wheel C transmittingly connected to the first output shaft 3a. Alternatively, when power transmission between the first countershaft 2a and the centralized driving piece 5 is connected, power transmission between the second countershaft 2b and the centralized driving piece 5 is connected, and power transmission between the second countershaft 2b and the second output 3b is connected, similarly, power of the second input shaft 1b is transmitted to the second output shaft 3b through the second countershaft 2b. The differential apparatus 4 is out of function, and most of power output by the first input shaft 1a is also transmitted to the second output shaft 3b through the first countershaft 2a, the first transmission assembly X1, the centralized driving piece 5, the second transmission assembly X2, and the second countershaft 2b.

It can be learned that the reducer 100 provided in this embodiment of this disclosure can centralize power of the first input shaft 1a and power of the second input shaft 1b, and transmit centralized power to one output shaft. Therefore, the reducer 100 provided in this embodiment of this disclosure is applied to an electric vehicle. The first input shaft 1a is transmittingly connected to an output shaft of the first motor E1, the second input shaft 1b is transmittingly connected to an output shaft of the second motor E2, the first output shaft 3a is transmittingly connected to a wheel C on one side of the vehicle, and the second output shaft 3b is transmittingly connected to a wheel C on the other side of the vehicle. When a wheel C on one side of the vehicle idles or slips, the differential apparatus 4 is out of function, and the first motor E1 and the second motor E2 can simultaneously transmit power to a wheel C that does not idle or slip in order to increase power of the vehicle in a driving situation that a wheel C on one side idles or slips.

As shown in FIG. 2, in the reducer 100 provided in this embodiment of this disclosure, the centralized driving piece 5 may include a centralized driving shaft 51. The centralized driving shaft 51 is located between the first countershaft 2a and the second countershaft 2b, and the first countershaft 2a, the centralized driving shaft 51, and the second countershaft 2b are coaxial, in other words, shafts of the first countershaft 2a, the centralized driving shaft 51, and the second countershaft 2b are on a same straight line.

On this basis, the first transmission assembly X1 and the second transmission assembly X2 may be in a form of cooperation between a gear and a synchronizer, and may be further implemented in the following two manners.

(1) As shown in FIG. 2, in a first implementation, the first transmission assembly X1 includes a first countershaft driving gear 61a, sleeved on the first countershaft 2a and transmittingly connected to the first countershaft 2a, a first countershaft synchronizer 7a, sleeved at one end of the centralized driving shaft 51 and transmittingly connected to the centralized driving shaft 51, and a first countershaft joint gear ring 62a, fastened on an end face that is of the first countershaft driving gear 61a and that is close to the first countershaft synchronizer 7a.

The first countershaft synchronizer 7a has a shift sleeve slidable along a shaft direction and engageable with the first countershaft joint gear ring 62a.

In the first transmission assembly X1, the shift sleeve of the first countershaft synchronizer 7a is slid along the shaft direction, to enable the shift sleeve of the first countershaft synchronizer 7a to engage with the first countershaft joint gear ring 62a, and to enable the shift sleeve of the first countershaft synchronizer 7a to engage with the first countershaft driving gear 61a such that power transmission of the first countershaft 2a is transmitted to the centralized driving shaft 51 through the first countershaft synchronizer 7a, and power transmission between the first countershaft 2a and the centralized driving piece 5 is connected.

The second transmission assembly X2 may also be in a form of cooperation between a gear and a synchronizer, and further includes a second countershaft driving gear 61b, sleeved on the second countershaft 2b and transmittingly connected to the second countershaft 2b, a second countershaft synchronizer 7b, sleeved at the other end of the centralized driving shaft 51 and transmittingly connected to the centralized driving shaft 51, and a second countershaft joint gear ring 62b, fastened on an end face that is of the second countershaft driving gear 61b and that is close to the second countershaft synchronizer 7b.

The second countershaft synchronizer 7b has a shift sleeve slidable along a shaft direction and engageable with the second countershaft joint gear ring 62b.

In the second transmission assembly X2, the shift sleeve of the second countershaft synchronizer 7b is slid along the shaft direction, to enable the shift sleeve of the second countershaft synchronizer 7b to engage with the second countershaft joint gear ring 62b, and to enable the shift sleeve of the second countershaft synchronizer 7b to engage with the second countershaft driving gear 61b such that power transmission of the second countershaft 2b is transmitted to the centralized driving shaft 51 through the second countershaft synchronizer 7b, and power transmission between the second countershaft 2b and the centralized driving piece 5 is connected.

Figure 3:
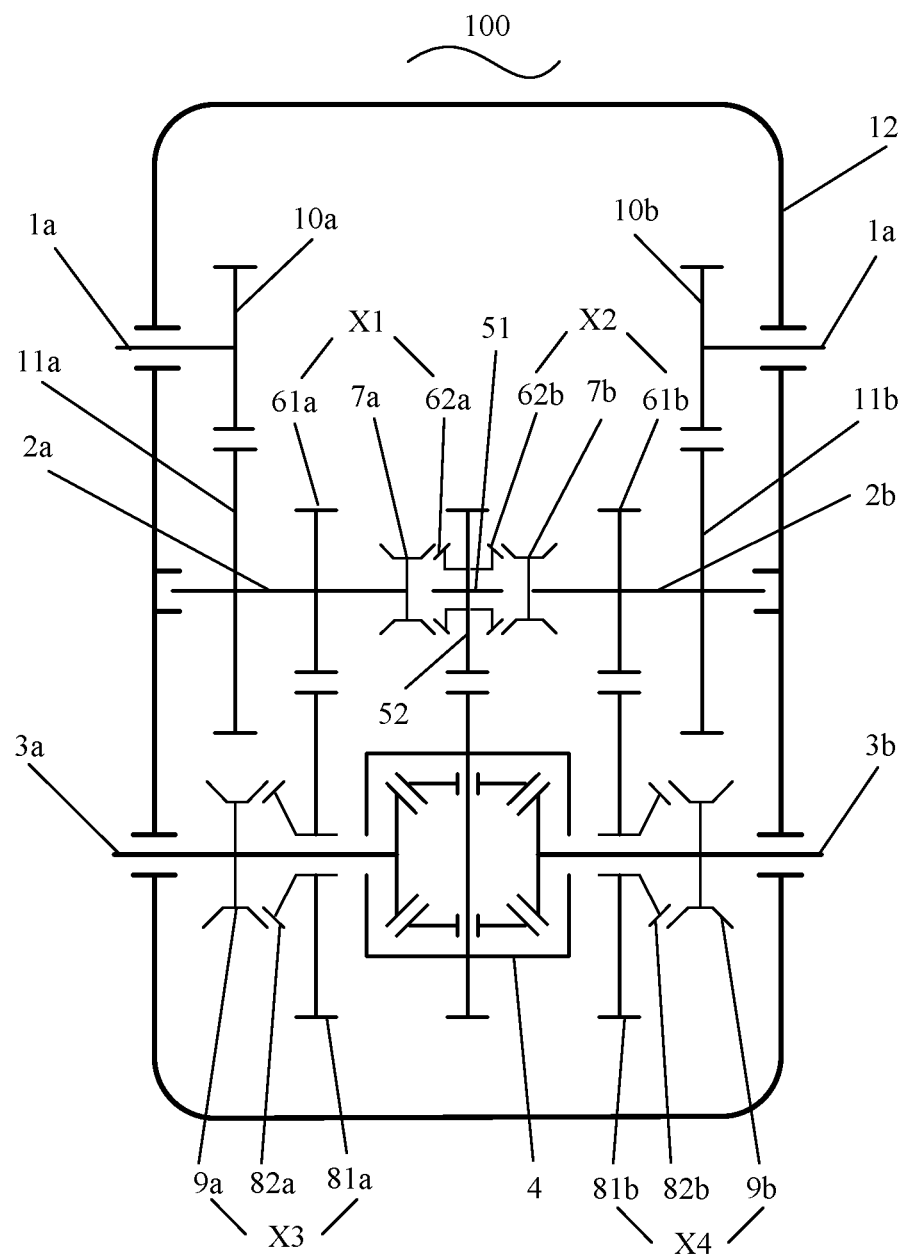
FIG. 3 is a schematic structural diagram of another reducer according to an embodiment of this disclosure.

(2) As shown in FIG. 3, in a second implementation, the centralized driving piece 5 further includes a centralized driving gear 52, and the centralized driving gear 52 is sleeved on the centralized driving shaft 51, and is transmittingly connected to the centralized driving shaft 51.

The first transmission assembly X1 includes a first countershaft driving gear 61a, sleeved on the first countershaft 2a and transmittingly connected to the first countershaft 2a, a first countershaft synchronizer 7a, sleeved on the first countershaft 2a and transmittingly connected to the first countershaft 2a, and a first countershaft joint gear ring 62a, fastened on one end face of the centralized driving gear 52.

The first countershaft synchronizer 7a has a shift sleeve slidable along a shaft direction and engageable with the first countershaft joint gear ring 62a.

In the first transmission assembly X1, the shift sleeve of the first countershaft synchronizer 7a is slid along the shaft direction, to enable the shift sleeve of the first countershaft synchronizer 7a to engage with the first countershaft joint gear ring 62a, and to enable the shift sleeve of the first countershaft synchronizer 7a to engage with the centralized driving gear 52 such that power transmission of the first countershaft 2a is transmitted to the centralized driving gear 52 through the first countershaft synchronizer 7a, and power transmission between the first countershaft 2a and the centralized driving piece 5 is connected.

The second transmission assembly X2 includes a second countershaft driving gear 61b, sleeved on the second countershaft 2b and transmittingly connected to the second countershaft 2b, a second countershaft synchronizer 7b, sleeved on the second countershaft 2b and transmittingly connected to the second countershaft 2b, and a second countershaft joint gear ring 62b, fastened on the other end face of the centralized driving gear 52.

The second countershaft synchronizer 7b has a shift sleeve slidable along a shaft direction and engageable with the second countershaft joint gear ring 62b.

In the second transmission assembly X2, the shift sleeve of the second countershaft synchronizer 7b is slid along the shaft direction, to enable the shift sleeve of the second countershaft synchronizer 7b to engage with the second countershaft joint gear ring 62b, and to enable the shift sleeve of the second countershaft synchronizer 7b to engage with the centralized driving gear 52 such that power transmission of the second countershaft 2b is transmitted to the centralized driving gear 52 through the second countershaft synchronizer 7b, and power transmission between the second countershaft 2b and the centralized driving piece 5 is connected.

Based on the foregoing disposition manners of the first transmission assembly X1 and the second transmission assembly X2, the third transmission assembly X3 may also be in a form of cooperation between a gear and a synchronizer, and further includes a first output shaft gear 81a, sleeved on the first output shaft 3a and engaging with the first countershaft driving gear 61a, a first output shaft synchronizer 9a, sleeved on the first output shaft 3a and transmittingly connected to the first output shaft 3a, and a first output shaft joint gear ring 82a, fastened on an end face that is of the first output shaft gear 81a and that is close to the first output shaft synchronizer 9a.

The first output shaft synchronizer 9a has a shift sleeve slidable along a shaft direction and engageable with the first output shaft joint gear ring 82a.

It should be noted herein that, in the embodiments of this disclosure, if "transmittingly connect" is not further limited, for a gear only "sleeved" on a shaft, power cannot be directly transmitted between the gear and the shaft.

In the third transmission assembly X3, the first output shaft gear 81a is only sleeved on the first output shaft 3a, and power cannot be directly transmitted between the first output shaft gear 81a and the first output shaft 3a. The shift sleeve of the first output shaft synchronizer 9a needs to be slid along the shaft direction, to enable the shift sleeve of the first output shaft synchronizer 9a to engage with the first output shaft joint gear ring 82a fastened on the first output shaft gear 81a, and to enable the first output shaft synchronizer 9a to be jointed with the first output shaft gear 81a such that power of the first output shaft gear 81a is transmitted to the first output shaft 3a through the first output shaft synchronizer 9a. Therefore, when the shift sleeve of the first output shaft synchronizer 9a engages with the first output shaft gear 81a, power of the first countershaft 2a is transmitted to the first output shaft synchronizer 9a through engaging between the first countershaft driving gear 61a and the first output shaft gear 81a, and then is transmitted to the first output shaft 3a such that power transmission between the first countershaft 2a and the first output shaft 3a is connected.

Correspondingly, the fourth transmission assembly X4 may also be in a form of cooperation between a gear and a synchronizer, and further includes a second output shaft gear 81b, sleeved on the second output shaft 3b and engaging with the second countershaft driving gear 61b, a second output shaft synchronizer 9b, sleeved on the second output shaft 3b and transmittingly connected to the second output shaft 3b, and a second output shaft joint gear ring 82b, fastened on an end face that is of the second output shaft gear 81b and that is close to the second output shaft synchronizer 9b.

The second output shaft synchronizer 9b has a shift sleeve slidable along a shaft direction and engageable with the second output shaft joint gear ring 82b.

According to the foregoing description, when the shift sleeve of the second output shaft synchronizer 9b engages with the second output shaft gear 81b, power of the second countershaft 2b is transmitted to the second output shaft synchronizer 9b through engaging between the second countershaft driving gear 61b and the second output shaft gear 81b, and then is transmitted to the second output shaft 3b such that power transmission between the second countershaft 2b and the second output shaft 3b is connected.

In this embodiment of this disclosure, the first countershaft synchronizer 7a, the second countershaft synchronizer 7b, the first output shaft synchronizer 9a, and the second output shaft synchronizer 9b each engage with a corresponding joint gear ring. Specifically, the following manner may be used for implementation. A bevel gear is disposed on an inner circumferential surface of the shift sleeve of the synchronizer, and a bevel gear that is engageable with the bevel gear on the inner circumferential surface of the joint gear ring is disposed on an outer circumferential surface of the shift sleeve in order to implement power transmission through engaging between the bevel gears.

In this embodiment of this disclosure, the first countershaft synchronizer 7a, the second countershaft synchronizer 7b, the first output shaft synchronizer 9a, and the second output shaft synchronizer 9b may be single-sided synchronizers. In other words, the sliding sleeve of the synchronizer can be slid along only one side of the shaft direction. Alternatively, the first countershaft synchronizer 7a, the second countershaft synchronizer 7b, the first output shaft synchronizer 9a, and the second output shaft synchronizer 9b may be dual-side synchronizers. In other words, the sliding sleeve of the synchronizer can be slid along two sides of the shaft direction.

In this embodiment of this disclosure, forms of the first transmission assembly X1, the second transmission assembly X2, the third transmission assembly X3, and the fourth transmission assembly X4 are not limited to the foregoing form of cooperation between the gear and the synchronizer. Any transmission assembly can be used provided that the transmission assembly can control power transmission to be connected or disconnected. For example, a clutch may be used to replace the first countershaft synchronizer 7a, the second countershaft synchronizer 7b, the first output shaft synchronizer 9a, and the second output shaft synchronizer 9b to implement connection or disconnection of power. It may be understood that, when the clutch is in a joint state, it is equivalent to that the shift sleeve of the synchronizer engages with the gear, or when the clutch is in a separated state, it is equivalent to that the shift sleeve of the synchronizer is separated from the gear.

As shown in FIG. 2 or FIG. 3, in this embodiment of this disclosure, transmitting connection between the first input shaft 1a and the first countershaft 2a and transmitting connection between the second input shaft 1b and the second countershaft 2b may be implemented through engaging between gears. Based on this, the reducer 100 provided in this embodiment of this disclosure may further include a first input shaft gear 10a, sleeved on the first input shaft 1a and transmittingly connected to the first input shaft 1a, a first countershaft driven gear 11a, sleeved on the first countershaft 2a, transmittingly connected to the first countershaft 2a, and engaging with the first input shaft gear 10a, a second input shaft gear 10b, sleeved on the second input shaft 1b and transmittingly connected to the second input shaft 1b, and a second countershaft driven gear 11b, sleeved on the second countershaft 2b, transmittingly connected to the second countershaft 2b, and engaging with the second input shaft gear 10b.

Power of the first input shaft 1a is transmitted to the first input shaft gear 10a, then is transmitted to the first countershaft driven gear 11a through engaging between the first input shaft gear 10a and the first countershaft driven gear 11a, and then is transmitted to the first countershaft 2a. Power of the second input shaft 1b is transmitted to the second input shaft gear 10b, then is transmitted to the second countershaft driven gear 11b through engaging between the second input shaft gear 10b and the second countershaft driven gear 11b, and then is transmitted to the second countershaft 2b.

It may be understood that the first countershaft driven gear 11a is disposed on one side that is of the first countershaft driving gear 61a and that is away from the first countershaft synchronizer 7a, and the second countershaft driven gear 11b is disposed on one side that is of the second countershaft driving gear 61a and that is away from the second countershaft synchronizer 7b.

Figure 4:
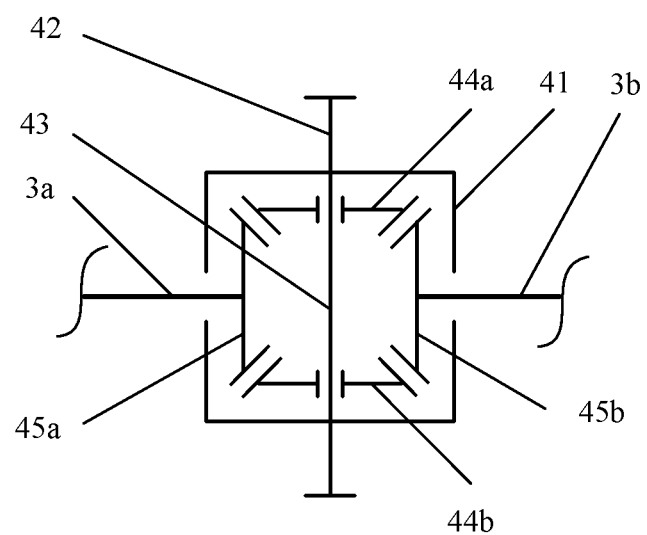
FIG. 4 is a schematic structural diagram of a differential apparatus in the reducer shown in FIG. 2 and FIG. 3.

As shown in FIG. 4, the differential apparatus 4 in the reducer 100 provided in this embodiment of this disclosure may be a gear differential apparatus, and includes a housing 41, a main transmission gear 42, fastened on an outer side of the housing 41 and transmittingly connected to the centralized driving piece 5, a planetary gear shaft 43, fastened inside the housing 41 and perpendicular to a shaft of the main transmission gear 42, a first planetary gear 44a, sleeved on the planetary gear shaft 43, a second planetary gear 44b, sleeved on the planetary gear shaft 43 and disposed opposite to the first planetary gear 44a, a first side gear 45a, located between the first planetary gear 44a and the second planetary gear 44b, and engaging with both the first planetary gear 44a and the second planetary gear 44b, and a second side gear 45b, located between the first planetary gear 44a and the second planetary gear 44b, disposed opposite to the first side gear 45a, and engaging with both the first planetary gear 44a and the second planetary gear 44b.

The first output shaft 3a passes through the housing 41 and is transmittingly connected to the first side gear drive 45a, and the second output shaft 3b passes through the housing 41 and is transmittingly connected to the second side gear 45b.

It may be understood that the first output shaft 3a and the second output shaft 3b are coaxial and perpendicular to the planetary gear shaft 43.

In the differential apparatus 4, the main transmission gear 42 is the power input end of the differential apparatus 4, and the first side gear 45a and the second side gear 45b are the two power output ends of the differential apparatus 4. The centralized driving piece 5 transmits power to the main transmission gear 42, to drive the main transmission gear 42 to rotate, and to drive the housing 41 to rotate by rotating the main transmission gear 42 such that the planetary gear shaft 43 fastened on the housing 41 rotates around a shaft of the first output shaft 3a and the second output shaft 3b as a center, and the first planetary gear 44a and the second planetary gear 44b rotate around the shaft of the first output shaft 3a and the second output shaft 3b, to drive the first side gear 45a and the second side gear 45b to rotate, to enable the first output shaft 3a and the second output shaft 3b to rotate in order to drive the vehicle. When the vehicle is in a straight-line driving state, the first planetary gear 44a and the second planetary gear 44b rotate around the shaft of the first output shaft 3a and the second output shaft 3b, and there is no relative rotation between the first planetary gear 44a, the first side gear 45a, the second planetary gear 44b, and the second side gear 45b. When the vehicle turns, because resistance of wheels C on two sides is different, when revolving around the shaft of the first output shaft 3a and the second output shaft 3b, the first planetary gear 44a and the second planetary gear 44b autorotate around the planetary gear shaft 43, and there is relative rotation between the first planetary gear 44a, the first side gear 45a, the second planetary gear 44b, and the second side gear 45b in order to implement a differential function to ensure that the vehicle turns smoothly.

In this embodiment of this disclosure, the main transmission gear 42 of the differential apparatus 4 may engage with the centralized transmission gear 52 to implement power transmission between the differential apparatus 4 and the centralized driving piece 5.

In the reducer 100 provided in this embodiment of this disclosure, for a component that is sleeved on the shaft and that is transmittingly connected to the shaft, power transmission between the component and the shaft may be implemented in a key (for example, a spline) connection manner.

Further, as shown in FIG. 2, the reducer 100 provided in this embodiment of this disclosure may further include a cover 12. A through hole is disposed at a position, corresponding to each of the first input shaft 1a, the second input shaft 1b, the first output shaft 3a, and the second output shaft 3b, on the cover 12 such that the first input shaft 1a and the second input shaft 1b are connected to the motors, and the first output shaft 3a and the second output shaft 3b are connected to the wheels C. The first countershaft 2a and the second countershaft 2b are fastened on an inner wall of the cover 12 in a rotatable manner.

Based on a structure of the foregoing reducer 100, an embodiment of this disclosure provides an electric vehicle drive system. The drive system is described in detail below.

Figure 5:
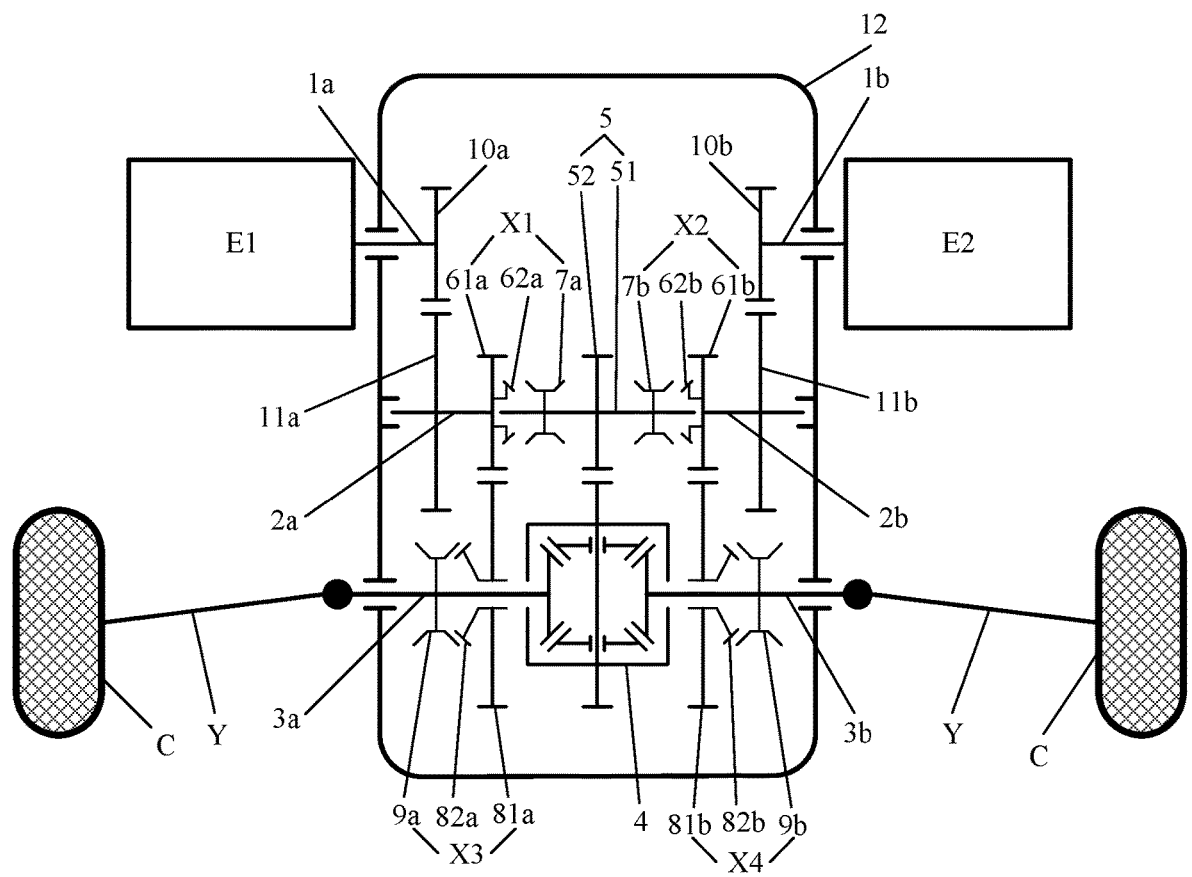
FIG. 5 is a schematic structural diagram of an electric vehicle drive system according to an embodiment of this disclosure.

FIG. 5 is a schematic structural diagram of an electric vehicle drive system according to an embodiment of this disclosure. As shown in FIG. 5, the drive system includes a first motor E1, a second motor E2, and the foregoing reducer 100.

The first input shaft 1a of the reducer 100 is transmittingly connected to an output shaft of the first motor E1, and the second input shaft 1b of the reducer 100 is transmittingly connected to an output shaft of the second motor E2.

In the drive system provided in this embodiment of this disclosure, the first input shaft 1a may implement power transmission between the first input shaft 1a and the output shaft of the first motor E1 in a key (for example, a spline) connection manner, and the second input shaft 1b may implement power transmission between the second input shaft 1b and the output shaft of the second motor E2 in a key (for example, a spline) connection manner.

The first output shaft 3a of the reducer 100 may be transmittingly connected to a wheel C on a left side of the vehicle, or may be transmittingly connected to a wheel C on a right side of the vehicle. This is not strictly limited in this embodiment of this disclosure. In the following, for ease of description, unless otherwise specified, an example in which the first output shaft 3a is transmittingly connected to a wheel C on a left side of the vehicle and the second output shaft 3b is transmittingly connected to a wheel C on a right side of the vehicle is used for description, and the left side and the right side of the vehicle are determined using a driving direction of the vehicle as a reference.

In the drive system provided in this embodiment of this disclosure, the first motor E1 is controlled to be in a driving state or a shutdown state, the second motor E2 is controlled to be in a driving state or a shutdown state, power transmission between the first countershaft 2a and the centralized driving piece 5 is controlled to be connected or disconnected, power transmission between the second countershaft 2b and the centralized driving piece 5 is controlled to be connected or disconnected, power transmission between the first countershaft 2a and the first output shaft 3a is controlled to be connected or disconnected, and power transmission between the second countershaft 2b and the second output shaft 3b is controlled to be connected or disconnected, to enable the drive system to be switched among six drive modes, such as a single-motor centralized drive mode, a dual-motor centralized drive mode, a dual-motor distributed drive mode, a single-motor single-side drive mode, a wheel lock-up dual-motor drive mode, and a wheel lock-up dual-motor drive mode, thereby meeting requirements in different driving situations.

The following describes in detail the six drive modes the single-motor centralized drive mode, the dual-motor centralized drive mode, the dual-motor distributed drive mode, the single-motor single-side drive mode, the wheel lock-up dual-motor drive mode, and the wheel lock-up dual-motor drive mode.

1. Single-Motor Centralized Drive Mode

In the single-motor centralized drive mode, one motor drives simultaneously a wheel C on a left side and a wheel C on a right side of the vehicle, to evenly distribute power to the wheel C on the left side and the wheel C on the right side. This drive mode is applicable to a driving situation that a single-side motor is faulty, or a vehicle is stable driving with a comparatively low requirement for power and torque. This helps improve working efficiency of the motor and economy of the vehicle.

The single-motor centralized drive mode further includes a first motor E1 centralized drive mode and a second motor E2 centralized drive mode.

In the first motor E1 centralized drive mode, the first motor E1 is in a driving state, the second motor E2 is in a shutdown state, power transmission between the first countershaft 2a and the centralized driving piece 5 is connected, power transmission between the second countershaft 2b and the centralized driving piece 5 is disconnected, power transmission between the first countershaft 2a and the first output shaft 3a is disconnected, and power transmission between the second countershaft 2b and the second output shaft 3b is disconnected.

The following further describes a power transmission path in the first motor E1 centralized drive mode using the drive system using the reducer 100 shown in FIG. 2 as an example.

Figure 6A:
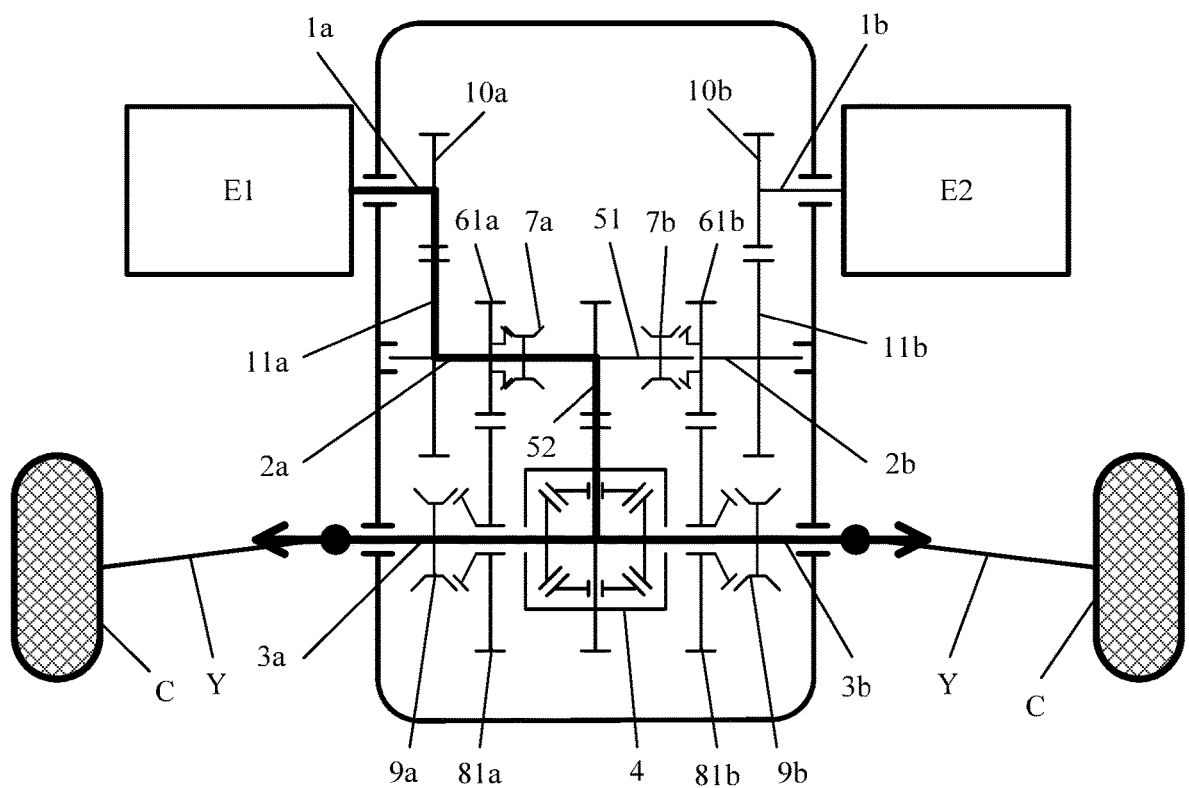
FIG. 6A is a schematic diagram of a power transmission path of the electric vehicle drive system shown in FIG. 5 in a single-motor centralized drive mode.

FIG. 6A shows the power transmission path of the drive system using the reducer 100 shown in FIG. 2 in the first motor E1 centralized drive mode.

As shown in FIG. 6A, the shift sleeve of the first countershaft synchronizer 7a engages with the first countershaft driving gear 61a, to connect power transmission between the first countershaft 2a and the centralized driving shaft 51. The shift sleeve of the second countershaft synchronizer 7b is separated from the second countershaft driving gear 61b, to disconnect power transmission between the second countershaft 2b and the centralized driving shaft 51. The shift sleeve of the first output shaft synchronizer 9a is separated from the first output shaft gear 81a, to disconnect power transmission between the first countershaft 2a and the first output shaft 3a. The shift sleeve of the second output shaft synchronizer 9b is separated from the second output shaft gear 81b, to disconnect power transmission between the second countershaft 2b and the second output shaft 3b.

Power output by the first motor E1 is transmitted to the centralized driving shaft 51 through the first input shaft 1a, the first input shaft gear 10a, the first countershaft driven gear 11a, the first countershaft 2a, the first countershaft driving gear 61a, and the first countershaft synchronizer 7a. Power transmitted to the centralized driving shaft 51 is transmitted to the differential apparatus 4 through the centralized driving gear 52, and then is separately transmitted to the first output shaft 3a and the second output shaft 3b in order to drive a wheel C on a left side and a wheel C on a right side of the vehicle to rotate.

When the vehicle turns, the differential apparatus 4 has a differential function in order to ensure that the vehicle turns smoothly.

In the second motor E2 centralized drive mode, the first motor E1 is in a shutdown state, the second motor E2 is in a driving state, power transmission between the first countershaft 2a and the centralized driving piece 5 is disconnected, power transmission between the second countershaft 2b and the centralized driving piece 5 is connected, power transmission between the first countershaft 2a and the first output shaft 3a is disconnected, and power transmission between the second countershaft 2b and the second output shaft 3b is disconnected.

For a power transmission path in the second motor E2 centralized drive mode, refer to the foregoing description of the power transmission path in the first motor E1 centralized drive mode. Details are not described herein again.

2. Dual-Motor Centralized Drive Mode

In the dual-motor centralized drive mode, two motors simultaneously drive a wheel C on a left side and a wheel C on a right side of the vehicle, to evenly distribute power to the wheel C on the left side and the wheel C on the right side. This drive mode is applicable to a driving situation with a comparatively high requirement for driving torque such as abrupt acceleration and climbing. This can ensure sufficient power of the vehicle.

In the dual-motor centralized drive mode, the first motor E1 is in a driving state, the second motor E2 is in a driving state, power transmission between the first countershaft 2a and the centralized driving piece 5 is connected, power transmission between the second countershaft 2b and the centralized driving piece 5 is connected, power transmission between the first countershaft 2a and the first output shaft 3a is disconnected, and power transmission between the second countershaft 2b and the second output shaft 3b is disconnected.

The following further describes a power transmission path in the dual-motor centralized drive mode using the drive system using the reducer 100 shown in FIG. 2 as an example.

Figure 6B:
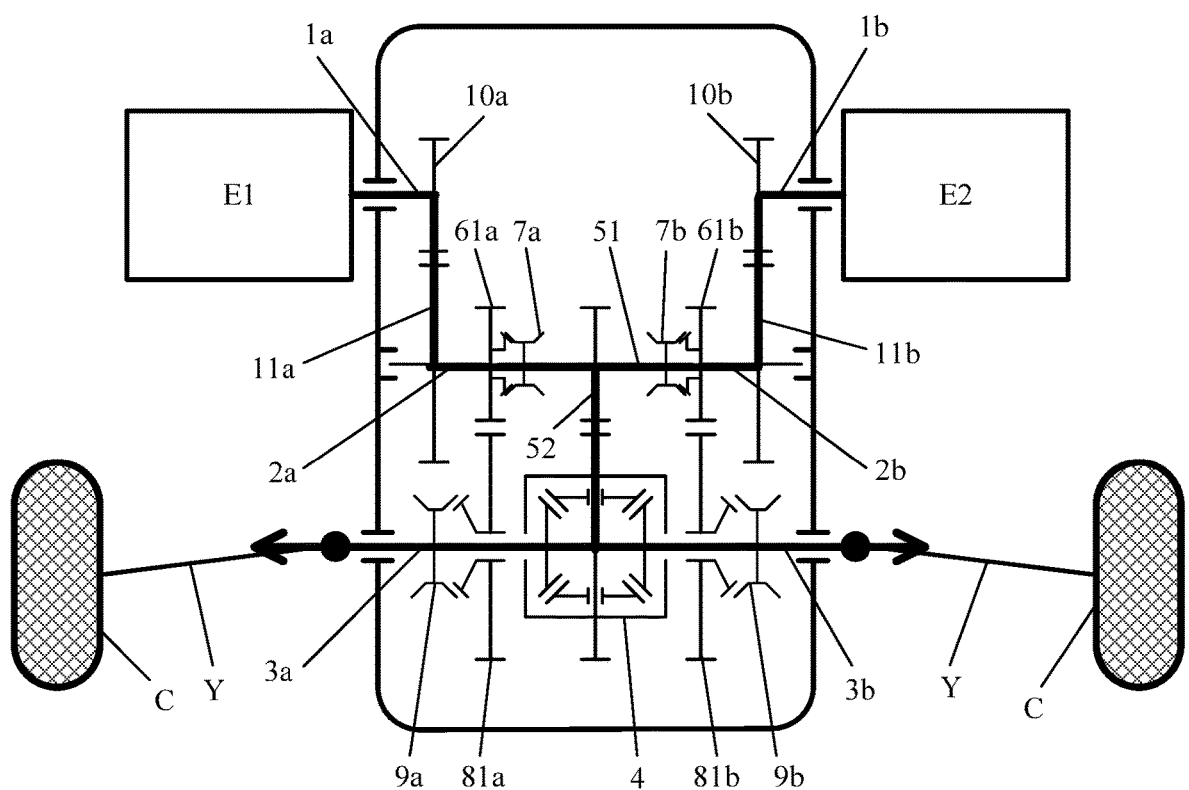
FIG. 6B is a schematic diagram of a power transmission path of the electric vehicle drive system shown in FIG. 5 in a dual-motor centralized drive mode.

FIG. 6B shows the power transmission path of the drive system using the reducer 100 shown in FIG. 2 in the dual-motor centralized drive mode.

As shown in FIG. 6B, the shift sleeve of the first countershaft synchronizer 7a engages with the first countershaft driving gear 61a, to connect power transmission between the first countershaft 2a and the centralized driving shaft 51. The shift sleeve of the second countershaft synchronizer 7b engages with the second countershaft driving gear 61b, to connect power transmission between the second countershaft 2b and the centralized driving shaft 51. The shift sleeve of the first output shaft synchronizer 9a is separated from the first output shaft gear 81a, to disconnect power transmission between the first countershaft 2a and the first output shaft 3a. The shift sleeve of the second output shaft synchronizer 9b is separated from the second output shaft gear 81b, to disconnect power transmission between the second countershaft 2b and the second output shaft 3b.

Power output by the first motor E1 is transmitted to the centralized driving shaft 51 through the first input shaft 1a, the first input shaft gear 10a, the first countershaft driven gear 11a, the first countershaft 2a, the first countershaft driving gear 61a, and the first countershaft synchronizer 7a. Power output by the second motor E2 is also transmitted to the centralized driving shaft 51 through the second input shaft 1b, the second input shaft gear 10b, the second countershaft driven gear 11b, the second countershaft 2b, the second countershaft driving gear 61b, and the second countershaft synchronizer 7b. Power transmitted to the centralized driving piece 5 is transmitted to the differential apparatus 4 through the centralized driving gear 52, and then is separately transmitted to the first output shaft 3a and the second output shaft 3b in order to drive a wheel C on a left side and a wheel C on a right side of the vehicle to rotate.

When the vehicle turns, the differential apparatus 4 has a differential function in order to ensure that the vehicle turns smoothly.

3. Dual-Motor Distributed Drive Mode

In the dual-motor distributed drive mode, two motors respectively drive a wheel C on a left side and a wheel C on a right side of the vehicle. This drive mode is applicable to a driving situation with a stability control requirement such as sharp turning, low road adhesion, and high-speed driving, to ensure stable driving of the vehicle.

In the dual-motor distributed drive mode, the first motor E1 is in a driving state, the second motor E2 is in a driving state, power transmission between the first countershaft 2a and the centralized driving piece 5 is disconnected, power transmission between the second countershaft 2b and the centralized driving piece 5 is disconnected, power transmission between the first countershaft 2a and the first output shaft 3a is connected, and power transmission between the second countershaft 2b and the second output shaft 3b is connected.

The following further describes a power transmission path in the dual-motor distributed drive mode using the drive system using the reducer 100 shown in FIG. 2 as an example.

Figure 6C:
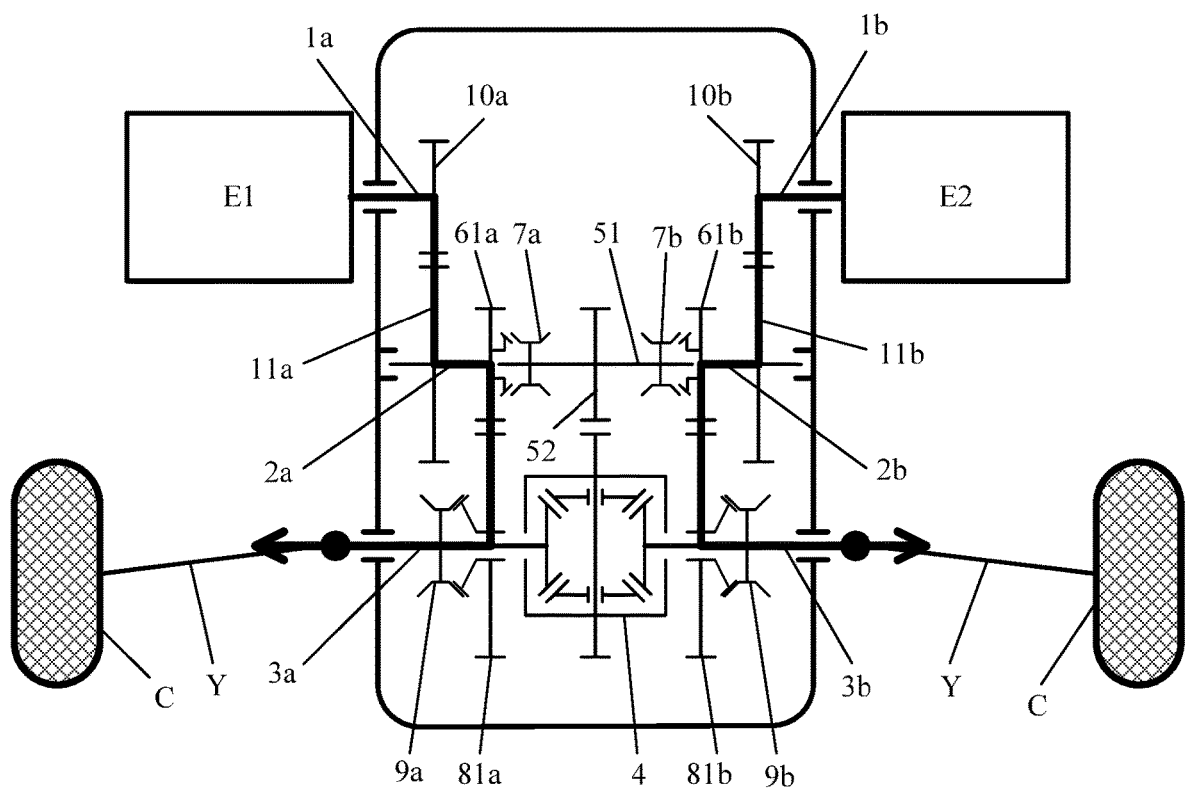
FIG. 6C is a schematic diagram of a power transmission path of the electric vehicle drive system shown in FIG. 5 in a dual-motor distributed drive mode.

FIG. 6C shows the power transmission path of the drive system using the reducer 100 shown in FIG. 2 in the dual-motor distributed drive mode.

As shown in FIG. 6C, the shift sleeve of the first countershaft synchronizer 7a is separated from the first countershaft driving gear 61a, to disconnect power transmission between the first countershaft 2a and the centralized driving shaft 51. The shift sleeve of the second countershaft synchronizer 7b is separated from the second countershaft driving gear 61b, to disconnect power transmission between the second countershaft 2b and the centralized driving shaft 51. The shift sleeve of the first output shaft synchronizer 9a engages with the first output shaft gear 81a, to connect power transmission between the first countershaft 2a and the first output shaft 3a. The shift sleeve of the second output shaft synchronizer 9b engages with the second output shaft gear 81b, to connect power transmission between the second countershaft 2b and the second output shaft 3b.

Power output by the first motor E1 is transmitted to the first output shaft 3a through the first input shaft 1a, the first input shaft gear 10a, the first countershaft driven gear 11a, the first countershaft 2a, the first countershaft driving gear 61a, the first output shaft gear 81a, and the first output shaft synchronizer 9a in order to drive the wheel C on the left side of the vehicle to rotate. Power output by the second motor E2 is transmitted to the second output shaft 3b through the second input shaft 1b, the second input shaft gear 10b, the second countershaft driven gear 1b, the second countershaft 2b, the second countershaft driving gear 61b, the second output shaft gear 81b, and the second output shaft synchronizer 9b in order to drive the wheel C on the right side of the vehicle to rotate.

4. Single-Motor Single-Side Drive Mode

In the single-motor single-side drive mode, one motor independently drives a wheel C on a same side as the motor. This drive mode is applicable to a driving situation that a wheel C on one side idles or slips with a comparatively low requirement for driving torque.

The single-motor single-side drive mode further includes a first motor E1 single-side drive mode applicable to a driving situation that a right wheel C of the vehicle idles or slips and a second motor E2 single-side drive mode applicable to a driving situation that a left wheel C of the vehicle idles or slips.

In the first motor E1 single-side drive mode, the first motor E1 is in a driving state, the second motor E2 is in a shutdown state, power transmission between the first countershaft 2a and the centralized driving piece 5 is disconnected, power transmission between the second countershaft 2b and the centralized driving piece 5 is disconnected, power transmission between the first countershaft 2a and the first output shaft 3a is connected, and power transmission between the second countershaft 2b and the second output shaft 3b is disconnected.

The following further describes a power transmission path in the first motor E1 single-side drive mode using the drive system using the reducer 100 shown in FIG. 2 as an example.

Figure 6D:
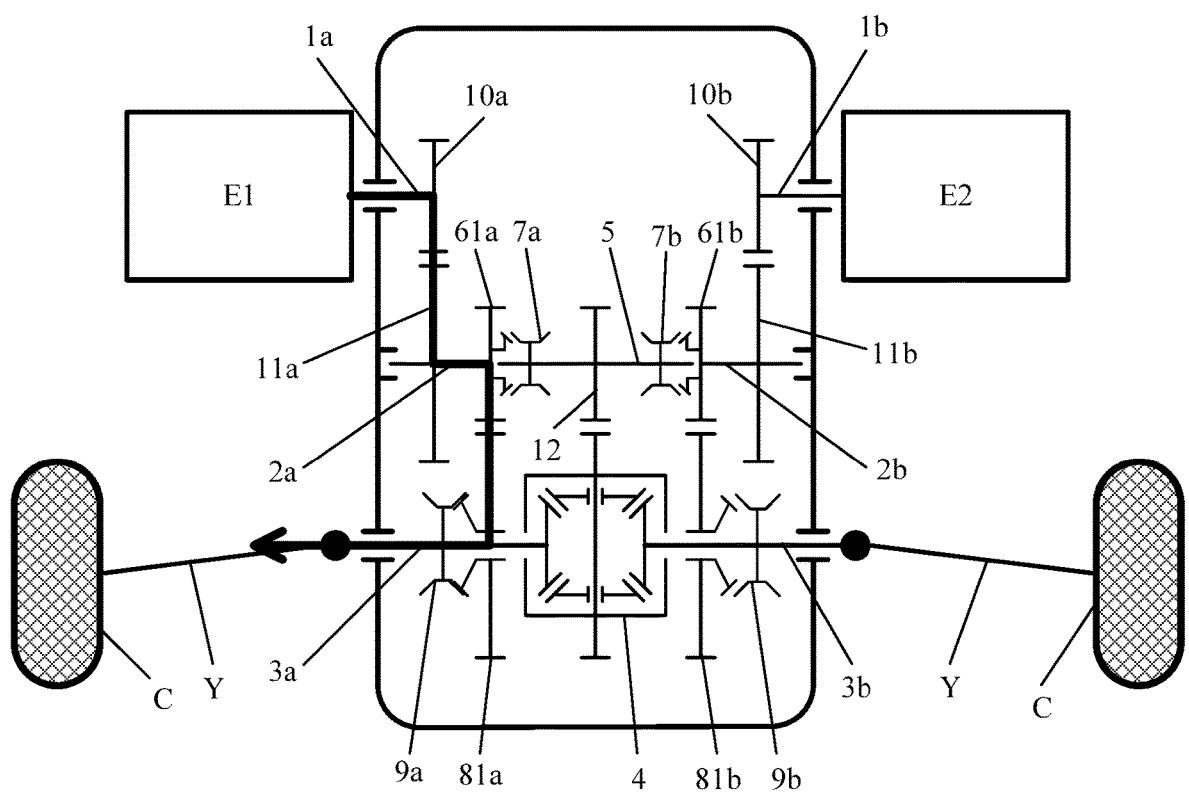
FIG. 6D is a schematic diagram of a power transmission path of the electric vehicle drive system shown in FIG. 5 in a single-motor single-side drive mode.

FIG. 6D shows the power transmission path of the drive system using the reducer 100 shown in FIG. 2 in the first motor E1 single-side drive mode.

As shown in FIG. 6D, the shift sleeve of the first countershaft synchronizer 7a is separated from the first countershaft driving gear 61a, to disconnect power transmission between the first countershaft 2a and the centralized driving piece 5. The shift sleeve of the second countershaft synchronizer 7b is separated from the second countershaft driving gear 61b, to disconnect power transmission between the second countershaft 2b and the centralized driving piece 5. The shift sleeve of the first output shaft synchronizer 9a engages with the first output shaft gear 81a, to connect power transmission between the first countershaft 2a and the first output shaft 3a. The shift sleeve of the second output shaft synchronizer 9b is separated from the second output shaft gear 81b, to disconnect power transmission between the second countershaft 2b and the second output shaft 3b.

Power output by the first motor E1 is transmitted to the first output shaft 3a through the first input shaft 1a, the first input shaft gear 10a, the first countershaft driven gear 11a, the first countershaft 2a, the first countershaft driving gear 61a, the first output shaft gear 81a, and the first output shaft synchronizer 9a in order to drive the left wheel C of the vehicle to rotate.

In the second motor E2 single-side drive mode, the first motor E1 is in a shutdown state, the second motor E2 is in a driving state, power transmission between the first countershaft 2a and the centralized driving piece 5 is disconnected, power transmission between the second countershaft 2b and the centralized driving piece 5 is disconnected, power transmission between the first countershaft 2a and the first output shaft 3a is disconnected, and power transmission between the second countershaft 2b and the second output shaft 3b is connected.

For a power transmission path in the second motor E2 single-side drive mode, refer to the foregoing description of the power transmission path in the first motor E1 single-side drive mode. Details are not described herein again.

5. Wheel Lock-Up Dual-Motor Drive Mode

In the wheel lock-up dual-motor drive mode, two motors jointly drive a wheel C on one side. In this drive mode, a wheel on a left side and a wheel on a right side of the vehicle are locked as a whole. The differential apparatus 4 is out of differential function, and power is mainly transmitted to a wheel C on one side that does not idle or slip. This drive mode is applicable to a driving situation that a wheel on one side idles or slips with a comparatively high requirement for driving torque.

The wheel lock-up dual-motor drive mode includes a first wheel lock-up dual-motor drive mode and a second wheel lock-up dual-motor drive mode.

(1) First Wheel Lock-Up Dual-Motor Drive Mode

For a driving situation that a wheel C on a right side of the vehicle idles or slips, the first motor E1 is in a driving state, the second motor E2 is in a driving state, power transmission between the first countershaft 2a and the centralized driving piece 5 is connected, power transmission between the second countershaft 2b and the centralized driving piece 5 is connected, power transmission between the first countershaft 2a and the first output shaft 3a is connected, and power transmission between the second countershaft 2b and the second output shaft 3b is disconnected.

The Following Further Describes, Using the Drive System Using the Reducer 100 Shown in FIG. 2 as an example, a power transmission path in the first wheel lock-up dual-motor drive mode that is applicable to a driving situation that a wheel on a right side of the vehicle idles or slips.

Figure 6E:
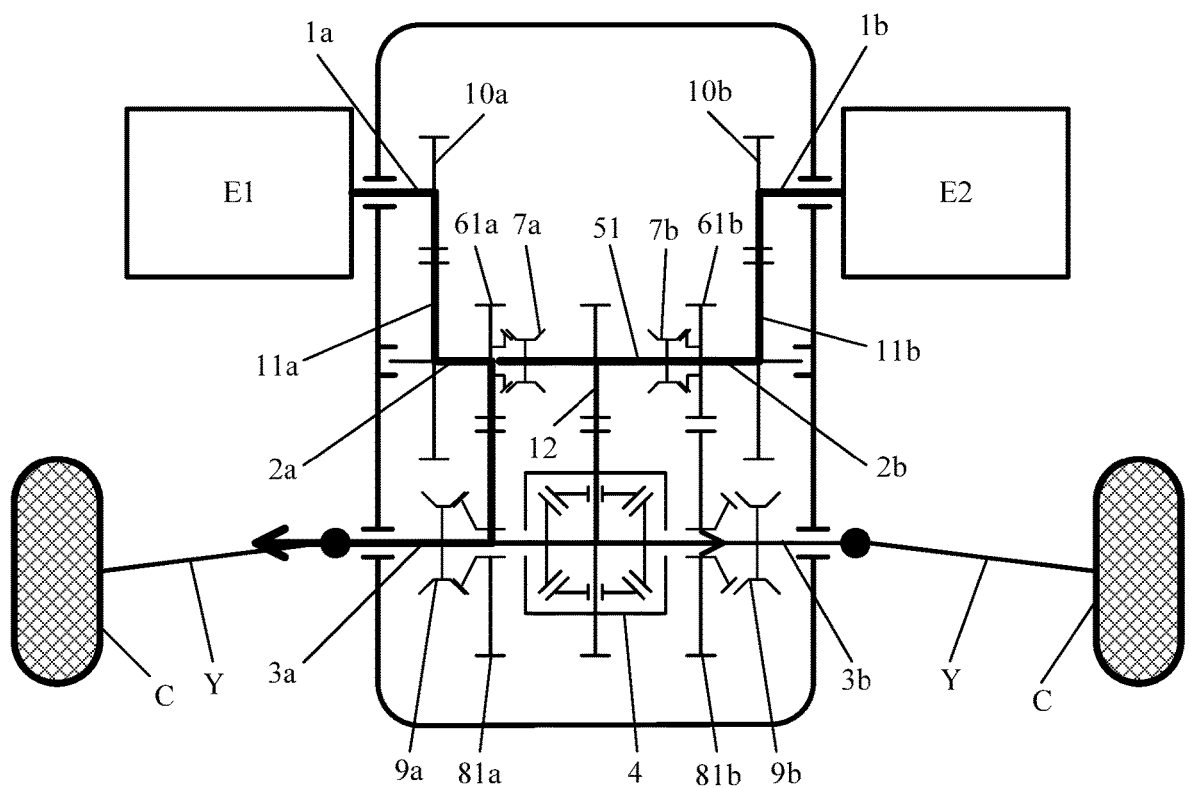
FIG. 6E is a schematic diagram of a power transmission path of the electric vehicle drive system shown in FIG. 5 in a first wheel lock-up dual-motor drive mode.

FIG. 6E shows the power transmission path of the drive system using the reducer 100 shown in FIG. 2 in the first wheel lock-up dual-motor drive mode.

As shown in FIG. 6E, the shift sleeve of the first countershaft synchronizer 7a engages with the first countershaft driving gear 61a, to connect power transmission between the first countershaft 2a and the centralized driving shaft 51. The shift sleeve of the second countershaft synchronizer 7b engages with the second countershaft driving gear 61*b*, to connect power transmission between the second countershaft 2*b* and the centralized driving shaft 51. The shift sleeve of the first output shaft synchronizer 9*a* engages with the first output shaft gear 81*a*, to connect power transmission between the first countershaft 2*a* and the first output shaft 3*a*. The shift sleeve of the second output shaft synchronizer 9*b* is separated from the second output shaft gear 81*b*, to disconnect power transmission between the second countershaft 2*b* and the second output shaft 3*b*.

Power output by the first motor E1 is transmitted to the first output shaft 3*a* through the first input shaft 1*a*, the first input shaft gear 10*a*, the first countershaft driven gear 11*a*, the first countershaft 2*a*, the first countershaft driving gear 61*a*, the first output shaft gear 81*a*, and the first output shaft synchronizer 9*a*. Power output by the second motor E2 is transmitted to the centralized driving shaft 51 through the second input shaft 1*b*, the second input shaft gear 10*b*, the second countershaft driven gear 11*b*, the second countershaft 2*b*, the second countershaft driving gear 61*b*, and the second countershaft synchronizer 7*b*. Most of power transmitted to the centralized driving shaft 51 is transmitted to the first countershaft driving gear 61*a* through the first countershaft synchronizer 7*a*, and then is also transmitted to the first output shaft 3*a* through the first output shaft gear 81*a* and the first output shaft synchronizer 9*a* in order to drive a wheel C on a left side of the vehicle to rotate.

As shown in FIG. 6E, a small part of power transmitted to the centralized driving shaft 51 is transmitted to the differential apparatus 4 through the centralized driving gear 52, and then is transmitted to the first output shaft 3*a* and the second output shaft 3*b* through the differential apparatus 4.

For a driving situation that a wheel C on a left side of the vehicle idles or slips, the first motor E1 is in a driving state, the second motor E2 is in a driving state, power transmission between the first countershaft 2*a* and the centralized driving piece 5 is connected, power transmission between the second countershaft 2*b* and the centralized driving piece 5 is connected, power transmission between the first countershaft 2*a* and the first output shaft 3*a* is disconnected, and power transmission between the second countershaft 2*b* and the second output shaft 3*b* is connected.

For a power transmission path in the drive mode that is applicable to a driving situation that the wheel C on the left side of the vehicle idles or slips, refer to the foregoing description of the power transmission path in the drive mode that is applicable to the driving situation that the wheel C on the right side of the vehicle idles or slips. Details are not described herein again.

(2) Second Wheel Lock-Up Dual-Motor Drive Mode

In the second wheel lock-up dual-motor drive mode, the first motor E1 is in a driving state, the second motor E2 is in a driving state, power transmission between the first countershaft 2*a* and the centralized driving piece 5 is connected, power transmission between the second countershaft 2*b* and the centralized driving piece 5 is connected, power transmission between the first countershaft 2*a* and the first output shaft 3*a* is connected, and power transmission between the second countershaft 2*b* and the second output shaft 3*b* is connected.

The following further describes, using the drive system using the reducer 100 shown in FIG. 2 as an example, a power transmission path in the second wheel lock-up dual-motor drive mode that is applicable to a driving situation that a wheel on a right side of the vehicle idles or slips.

Figure 6F:
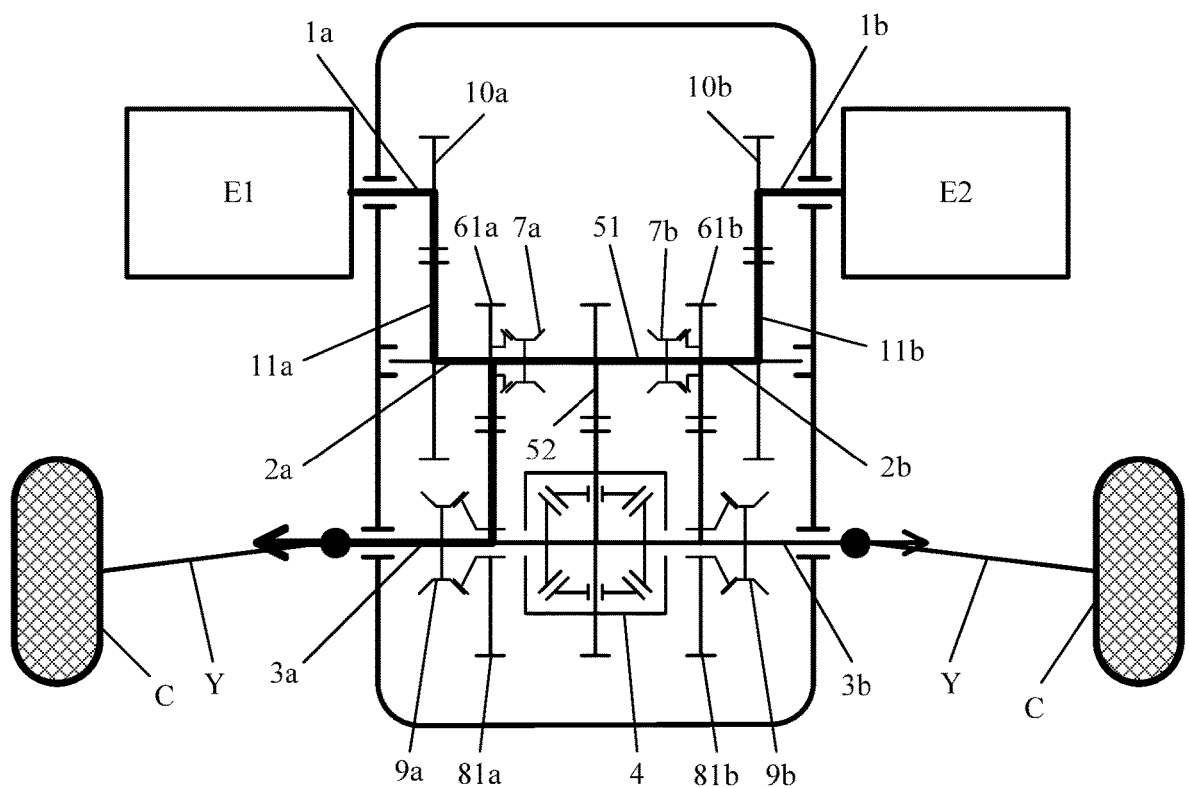
FIG. 6F is a schematic diagram of a power transmission path of the electric vehicle drive system shown in FIG. 5 in a second wheel lock-up dual-motor drive mode.

FIG. 6F shows the power transmission path of the drive system using the reducer 100 shown in FIG. 2 in the second wheel lock-up dual-motor drive mode and in a driving situation that the wheel C on the right side idles or slips.

As shown in FIG. 6F, the shift sleeve of the first countershaft synchronizer 7*a* engages with the first countershaft driving gear 61*a*, to connect power transmission between the first countershaft 2*a* and the centralized driving shaft 51. The shift sleeve of the second countershaft synchronizer 7*b* engages with the second countershaft driving gear 61*b*, to connect power transmission between the second countershaft 2*b* and the centralized driving shaft 51. The shift sleeve of the first output shaft synchronizer 9*a* engages with the first output shaft gear 81*a*, to connect power transmission between the first countershaft 2*a* and the first output shaft 3*a*. The shift sleeve of the second output shaft synchronizer 9*b* engages with the second output shaft gear 81*b*, to connect power transmission between the second countershaft 2*b* and the second output shaft 3*b*.

Power output by the first motor E1 is transmitted to the first output shaft 3*a* through the first input shaft 1*a*, the first input shaft gear 10*a*, the first countershaft driven gear 11*a*, the first countershaft 2*a*, the first countershaft driving gear 61*a*, the first output shaft gear 81*a*, and the first output shaft synchronizer 9*a*. Power output by the second motor E2 is transmitted to the second countershaft 2*b* through the second input shaft 1*b*, the second input shaft gear 10*b*, the second countershaft driven gear 11*b*. Most of power transmitted to the second countershaft 2*b* is transmitted to the centralized driving shaft 51 through the second countershaft driving gear 61*b* and the second countershaft synchronizer 7*b*. Most of power transmitted to the centralized driving shaft 51 is transmitted to the first countershaft driving gear 61*a* through the first countershaft synchronizer 7*a*, and then is also transmitted to the first output shaft 3*a* through the first output shaft gear 81*a* and the first output shaft synchronizer 9*a* in order to drive a wheel C on a left side of the vehicle to rotate.

As shown in FIG. 6F, a small part of power transmitted to the second countershaft 2*b* is transmitted to the second output shaft 3*b* through the second countershaft driving gear 61*b*, the second output shaft gear 81*b*, and the second output shaft synchronizer 9*b*, and a small part of power transmitted to the centralized driving shaft 51 is transmitted to the differential apparatus 4 through the centralized driving gear 52, and then is transmitted to the first output shaft 3*a* and the second output shaft 3*b* through the differential apparatus 4.

In a driving process of the vehicle, a driving situation that a wheel C on one side idles or slips and a motor on the other side is faulty may be further encountered. In this driving situation, the drive system provided in this embodiment of this disclosure can further run in the wheel lock-up single-motor drive mode, and a motor on one side that idling or slipping occurs drives a wheel C on one side that does not idle or slip.

6. Wheel Lock-Up Single-Motor Drive Mode

In the wheel lock-up single-motor drive mode, when a wheel C on a right side of the vehicle idles or slips, and the first motor E1 on a left side is faulty, the first motor E1 is in a shutdown state, the second motor E2 is in a driving state, power transmission between the first countershaft 2*a* and the centralized driving piece 5 is connected, power transmission between the second countershaft 2*b* and the centralized driving piece 5 is connected, power transmission between the first countershaft 2*a* and the first output shaft 3*a* is connected, and power transmission between the second countershaft 2*b* and the second output shaft 3*b* is disconnected.

The following further describes, using the drive system using the reducer 100 shown in FIG. 2 as an example, a power transmission path in the wheel lock-up single-motor drive mode that is applicable to a driving situation that a wheel C on a right side of the vehicle idles or slips, and the first motor E1 on the left side is faulty.

Figure 6G:
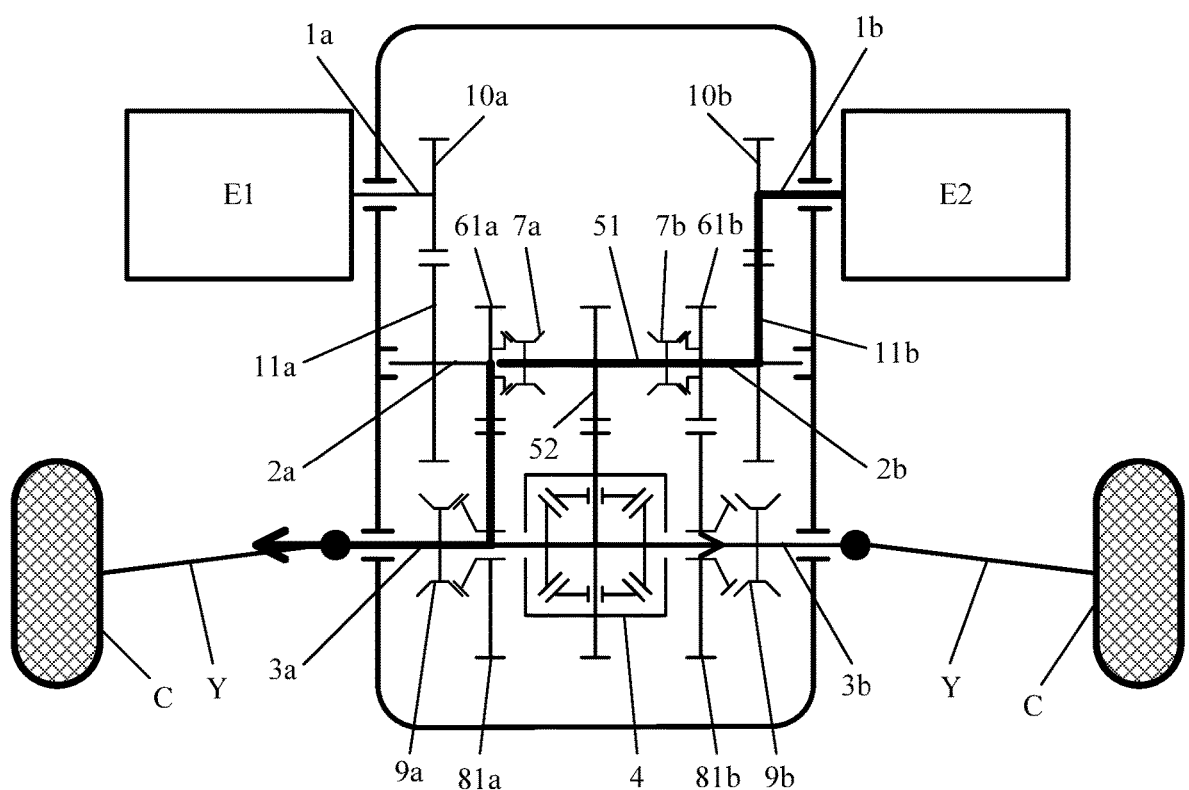
FIG. 6G is a schematic diagram of a power transmission path of the electric vehicle drive system shown in FIG. 5 in a wheel lock-up single-motor drive mode.

FIG. 6G shows the power transmission path of the drive system using the reducer 100 shown in FIG. 2 in the wheel lock-up single-motor drive mode.

The shift sleeve of the first countershaft synchronizer 7a engages with the first countershaft driving gear 61a, to connect power transmission between the first countershaft 2a and the centralized driving shaft 51. The shift sleeve of the second countershaft synchronizer 7b engages with the second countershaft driving gear 61b, to connect power transmission between the second countershaft 2b and the centralized driving shaft 51. The shift sleeve of the first output shaft synchronizer 9a engages with the first output shaft gear 81a, to connect power transmission between the first countershaft 2a and the first output shaft 3a. The shift sleeve of the second output shaft synchronizer 9b is separated from the second output shaft gear 81b, to disconnect power transmission between the second countershaft 2b and the second output shaft 3b.

Power output by the second motor E2 is transmitted to the centralized driving shaft 51 through the second input shaft 1b, the second input shaft gear 10b, the second countershaft driven gear 11b, the second countershaft 2b, the second countershaft driving gear 61b, and the second countershaft synchronizer 7b. Most of power transmitted to the centralized driving shaft 51 is transmitted to the first countershaft driving gear 61a through the first countershaft synchronizer 7a, and then is transmitted to the first output shaft 3a through the first output shaft gear 81a and the first output shaft synchronizer 9a in order to drive a wheel C on a left side of the vehicle to rotate.

As shown in FIG. 6G, a small part of power transmitted to the centralized driving shaft 51 is transmitted to the differential apparatus 4 through the centralized driving gear 52, and then is transmitted to the first output shaft 3a and the second output shaft 3b through the differential apparatus 4.

When a wheel C on a left side of the vehicle idles or slips and the second motor E2 on a right side is faulty, the first motor E1 is in a driving state, the second motor E2 is in a shutdown state, power transmission between the first countershaft 2a and the centralized driving piece 5 is connected, power transmission between the second countershaft 2b and the centralized driving piece 5 is connected, power transmission between the first countershaft 2a and the first output shaft 3a is disconnected, and power transmission between the second countershaft 2b and the second output shaft 3b is connected. For a power transmission path in this case, refer to the power transmission path when the wheel C on the right side of the vehicle idles or slips and the first motor E1 on the left side is faulty. Details are not described herein again.

Power transmission between the first countershaft 2a and the centralized driving piece 5, power transmission between the second countershaft 2b and the centralized driving piece 5, power transmission between the first countershaft 2a and the first output shaft 3a, and power transmission between the second countershaft 2b and the second output shaft 3b are all connected. The foregoing wheel lock-up single-motor drive mode may also be implemented. For a power transmission path in the wheel lock-up single-motor drive mode, refer to the power transmission path in each motor in the second wheel lock-up dual-motor drive mode. Details are not described herein again.

It should be noted that, in the wheel lock-up single-motor drive mode, because the vehicle needs to be driving with faults, a driving speed of the vehicle cannot be extremely high, and may be medium or low.

In the drive system provided in this embodiment of this disclosure, in the single-motor centralized drive mode and the single-motor single-side drive mode, a gear that does not need to transmit power does not rotate, thereby reducing energy consumption and improving overall economy of the vehicle.

FIG. 7 is a schematic structural diagram of another electric vehicle drive system according to an embodiment of this disclosure. In addition to the reducer 100, the first motor E1, and the second motor E2, the drive system further includes a vehicle controller 200, a reducer controller 400, a first motor controller 300a, a second motor controller 300b, and a power battery 500. The reducer controller 400 is electrically connected to the vehicle controller 200, the first motor controller 300a is electrically connected to the first motor E1 and the vehicle controller 200, and the second motor controller 300b is electrically connected to the second motor E2 and the vehicle controller 200, and the power battery 500 is electrically connected to the first motor controller 300a, the second motor controller 300b, and the vehicle controller 200.

The reducer controller 400 is configured to control power transmission between the first countershaft 2a and the centralized driving piece 5 to be connected or disconnected, power transmission between the second countershaft 2b and the centralized driving piece 5 to be connected or disconnected, power transmission between the first countershaft 2a and the first output shaft 3a to be connected or disconnected, and power transmission between the second countershaft 2b and the second output shaft 3b to be connected or disconnected. For the reducer 100 that uses the synchronizer to control power transmission shown in FIG. 2, the reducer controller 400 is configured to joint the shift sleeve of each of the first countershaft synchronizer 7a, the second countershaft synchronizer 7b, the first output shaft synchronizer 9a, and the second output shaft synchronizer 9b with a corresponding gear or separate the shift sleeve of each of the first countershaft synchronizer 7a, the second countershaft synchronizer 7b, the first output shaft synchronizer 9a, and the second output shaft synchronizer 9b from a corresponding gear.

The power battery 500 is configured to provide electric energy for the first motor E1 and the second motor E2.

The first motor controller 300a and the second motor controller 300b are respectively configured to control the first motor E1 and the second motor E2. On one hand, the first motor E1 and the second motor E2 are controlled to be in a driving state or a shutdown state. On the other hand, when the first motor E1 and the second motor E2 are in a driving state, torque output by the first motor E1 and torque output by the second motor E2 are controlled. The power battery 500 output a direct current. The first motor controller 300a and the second motor controller 300b are further configured to convert the direct current output by the battery 500 into an alternating current that can be identified by the first motor E1 and the second motor E2.

The vehicle controller 200 is a coordination control center of the vehicle, and is configured to send a control instruction to the reducer controller 400, the first motor controller 300a, the second motor controller 300b, and the power battery 500 based on a driving situation of the vehicle.

Table 1 is a status summary of the first motor E1, the second motor E2, the first countershaft synchronizer 7a, the second countershaft synchronizer 7b, the first output shaft synchronizer 9a, and the second output shaft synchronizer 9b of the drive system using the reducer 100 shown in FIG. 2 in each drive mode.

TABLE 1

Drive mode status summary

| Drive mode | Control state | | | | | | To which a driving situation is applicable |
|---|---|---|---|---|---|---|---|
| | First motor | Second motor | First countershaft synchronizer | Second countershaft synchronizer | First output shaft synchronizer | Second output shaft synchronizer | |
| Single-motor centralized drive mode | Driving | Shutdown | Joint | Separate | Separate | Separate | Low requirement for a diving torque or the second motor is faulty |
| | Shutdown | Driving | Separate | Joint | Separate | Separate | Low requirement for a diving torque or the first motor is faulty |
| Dual-motor centralized drive mode | Driving | Driving | Joint | Joint | Separate | Separate | Driving situation with a comparatively high requirement for driving torque such as abrupt acceleration and climbing |
| Dual-motor distributed drive mode | Driving | Driving | Separate | Separate | Joint | Joint | Driving situation with a stability control requirement such as sharp turning, low road adhesion, and high-speed driving |
| Single-motor single-side drive mode | Driving | Shutdown | Separate | Separate | Joint | Separate | Wheel on a right side idles or slips |
| | Shutdown | Driving | Separate | Separate | Separate | Joint | Wheel on a left side idles or slips |
| First wheel lock-up dual-motor drive mode | Driving | Driving | Joint | Joint | Joint | Separate | Wheel on a right side idles or slips and driving power of a single motor is insufficient |
| Second wheel lock-up dual-motor drive mode | Driving | Driving | Joint | Joint | Joint | Joint | Wheel on a left side or a right side idles or slips and driving power of a single motor is insufficient |
| Wheel lock-up single-motor drive mode | Driving | Shutdown | Joint | Joint | Separate | Joint | Wheel on a left side idles or slips and the second motor is faulty |
| | Shutdown | Driving | Joint | Joint | Joint | Separate | Wheel on a right side idles or slips and the first motor is faulty |
| | Driving (or shutdown) | Shutdown (or driving) | Joint | Joint | Joint | Joint | Wheel on one side idles or slips and a motor on the other side is faulty |

In conclusion, the drive system provided in this embodiment of this disclosure can meet performance requirements of the vehicle in various driving situations, which specifically represented as follows.

Economy of the vehicle is improved, when the vehicle is driving in a driving situation that there is a low requirement for power and torque, the single-motor centralized drive mode may be used, to improve a working point load and working efficiency of the motor and the reducer 100, thereby improving economy of the vehicle.

Driving power of the vehicle is ensured, when a driver heavily tramples on an acceleration pedal (in other words, an opening degree value of the acceleration pedal is comparatively large) and the vehicle needs to be accelerated abruptly, the dual-motor centralized drive mode may be used, to fully exert torques output by dual motors, thereby ensuring driving power of the vehicle.

Control stability of the vehicle is improved, when the vehicle is driving on a sharp turning, high speed, or wet sliding road, the dual-motor distributed drive mode may be used, to independently control driving torque of a left wheel C and driving torque of a right wheel C, thereby improving control stability of the vehicle.

Passability of the vehicle is improved, when the vehicle is driving on an uneven road or a muddy road, and a single-side wheel C idles or slips, the single-motor single-side drive mode may be used. If driving power of the single motor is insufficient, the left and right wheel lock-up dual-motor drive mode may be used, thereby improving passability of the vehicle.

System redundancy is improved, when a specific motor in the drive system is faulty, the single-motor centralized drive mode may be used, and a non-faulty motor continues to drive the vehicle to a nearby maintenance station, thereby improving system redundancy of the vehicle.

The drive system provided in this embodiment of this disclosure is applicable to various types of electric vehicles. According to an electric energy source, the electric vehicle includes but is not limited to a pure electric vehicle in which a rechargeable battery provides electric energy for a motor, an extended-range electric vehicle that provides electric energy for a motor by relying on power output by an engine, and a fuel cell electric vehicle that uses hydrogen and oxygen to generate electric energy using an electrochemical reaction under an action of a catalyst. According to a driving type, the electric vehicle may be a front-wheel-driven electric vehicle, a rear-wheel-driven electric vehicle, or a four-wheel-driven electric vehicle.

To enable the electric vehicle drive system provided in this embodiment of this disclosure to be switched among drive modes according to a driving situation of the vehicle, this embodiment of this disclosure provides a control method applied to the electric vehicle drive system. The following describes the control method in detail.

FIG. 8 is a flowchart of a control method for an electric vehicle drive system according to an embodiment of this disclosure. As shown in FIG. 8, the control method includes the following steps.

Step S1. Obtain a value of a current driving status parameter of a vehicle and an opening degree value of an acceleration pedal, and determine a current driving status of the vehicle based on the value of the current driving status parameter of the vehicle, where the driving status parameter includes at least a yaw angular velocity, acceleration, a steering wheel rotation angle, a wheel C rotational speed, a first motor E1 status parameter, and a second motor E2 status parameter.

Step S2. Control the drive system based on the current driving status of the vehicle and the opening degree value of the acceleration pedal.

In the control method, whether the vehicle has a stability control requirement is determined using the yaw angular velocity, the acceleration, and the steering wheel angle. Whether there is a wheel C slipping or idling is determined based on the wheel C rotational speed to determine whether the vehicle has a passability control requirement. Whether the first motor E1 and the second motor E2 are faulty are respectively determined using the first motor E1 status parameter and the second motor E2 status parameter. The opening degree value of the acceleration pedal is used to determine a torque requirement of a driver. A larger opening degree value of the acceleration pedal indicates a higher torque requirement of the driver.

Specifically, the yaw angular velocity refers to deflection of the vehicle around a vertical axis, and a yaw angular velocity value represents a stability degree of driving of the vehicle. When the yaw angular velocity value exceeds a specific value, it indicates that the vehicle is in an unstable driving status such as lateral sliding or tail throwing. A larger acceleration value also indicates that the vehicle may be in an unstable driving status. When a steering wheel angle value exceeds a specific value, it indicates that the vehicle may be in an unstable driving status such as a sharp turning or a lateral sliding.

In this embodiment of this disclosure, a preset value of the yaw angular velocity, a preset value of the acceleration, and a preset value of the steering wheel angle may be set to determine whether the vehicle is stable driving. For example, when at least one of current values of the yaw angular velocity, the acceleration, and the steering wheel angle is greater than or equal to the corresponding preset value, it may be considered that the vehicle is unstable and has the stability control requirement. When current values of the yaw angular velocity, the acceleration, and the steering wheel angle each are less than the corresponding preset value, it is considered that the vehicle is stable driving and has no the stability control requirement.

When a wheel C idles or slips, a rotational speed of the wheel C is obviously larger than a rotational speed of another wheel C. Therefore, whether there is a wheel C idling or slipping may be determined by comparing rotational speeds of the four wheels C. A preset value of a wheel C rotational speed difference may be set. When a difference between a rotational speed of a specific wheel C and a rotational speed of another wheel C exceeds the preset value, it indicates that the wheel C idles or slips. In this case, the vehicle has a passability control requirement.

In this embodiment of this disclosure, the preset value of the yaw angular velocity, the preset value of the acceleration, the steering wheel angle, the wheel C rotational speed, and the opening degree value of the acceleration pedal may be respectively obtained using a yaw angular velocity sensor, an acceleration sensor, a steering wheel angle sensor, a wheel C rotational speed sensor, and an acceleration pedal opening degree sensor. The first motor E1 status parameter and the second motor E2 status parameter may be respectively obtained by a first motor controller 300*a* and a second motor controller 300*b*. The foregoing sensors, the first motor controller 300*a*, and the second motor controller 300*b* transmit obtained information to a vehicle controller 200. The vehicle controller 200 determines, based on the received information, whether the vehicle is stable driving, whether there is a wheel C idling or slipping, and whether a driver has a comparatively high torque requirement, and send a corresponding instruction to a reducer controller 400, the first motor controller 300*a*, and the second motor controller 300*b* according to a determining result, to enable the drive system to enter a corresponding drive mode, and to meet a driving requirement of the vehicle.

It may be understood that the controlling the drive system mainly controls power transmission between the first countershaft 2*a* and the centralized driving piece 5 to be connected or disconnected, power transmission between the second countershaft 2*b* and the centralized driving piece 5 to be connected or disconnected, power transmission between the first countershaft 2*a* and the first output shaft 3*a* to be connected or disconnected, power transmission between the second countershaft 2*b* and the second output shaft 3*b* to be connected or disconnected, the first motor E1 to output torque or to be shut down, and the second motor E2 to output torque or to be shutdown.

The following describes in detail a control method in each drive mode of the drive system.

1. Control Method in a Single-Motor Centralized Drive Mode

When the current driving status of the vehicle is stable driving, no wheels C idle or slip, and the opening degree value of the acceleration pedal is less than or equal to a preset opening degree value, the vehicle has no stability control requirement and no passability control requirement, and the driver has a comparatively low torque requirement. In this case, the drive system is controlled to enter the single motor centralized drive mode. Alternatively, when one of the first motor E1 and the second motor E2 is faulty, but no wheels C idle or slip, the drive system is also controlled to enter the single-motor centralized drive mode.

Power transmission between the first countershaft 2a and the centralized driving piece 5 is controlled to be connected, power transmission between the second countershaft 2b and the centralized driving piece 5 is controlled to be disconnected, power transmission between the first countershaft 2a and the first output shaft 3a is controlled to be disconnected, power transmission between the second countershaft 2b and the second output shaft 3b is controlled to be disconnected, the first motor E1 is controlled to output torque, and the second motor E2 is controlled to be shut down, to enable the drive system to enter the first motor E1 centralized drive mode.

Power transmission between the first countershaft 2a and the centralized driving piece 5 is controlled to be disconnected, power transmission between the second countershaft 2b and the centralized driving piece 5 is controlled to be connected, power transmission between the first countershaft 2a and the first output shaft 3a is controlled to be disconnected, power transmission between the second countershaft 2b and the second output shaft 3b is controlled to be disconnected, the first motor E1 is controlled to be shut down, and the second motor E2 is controlled to output torque, to enable the drive system to enter the second motor E2 centralized drive mode.

In the single-motor centralized drive mode, torque required by the driver is determined based on the opening degree value of the acceleration pedal, the torque required by the driver is recorded as T, and torque output by a motor in a driving state may be T.

The following further describes a control method in the first motor E1 centralized drive mode using the drive system using the reducer 100 shown in FIG. 2 as an example.

Figure 9A:
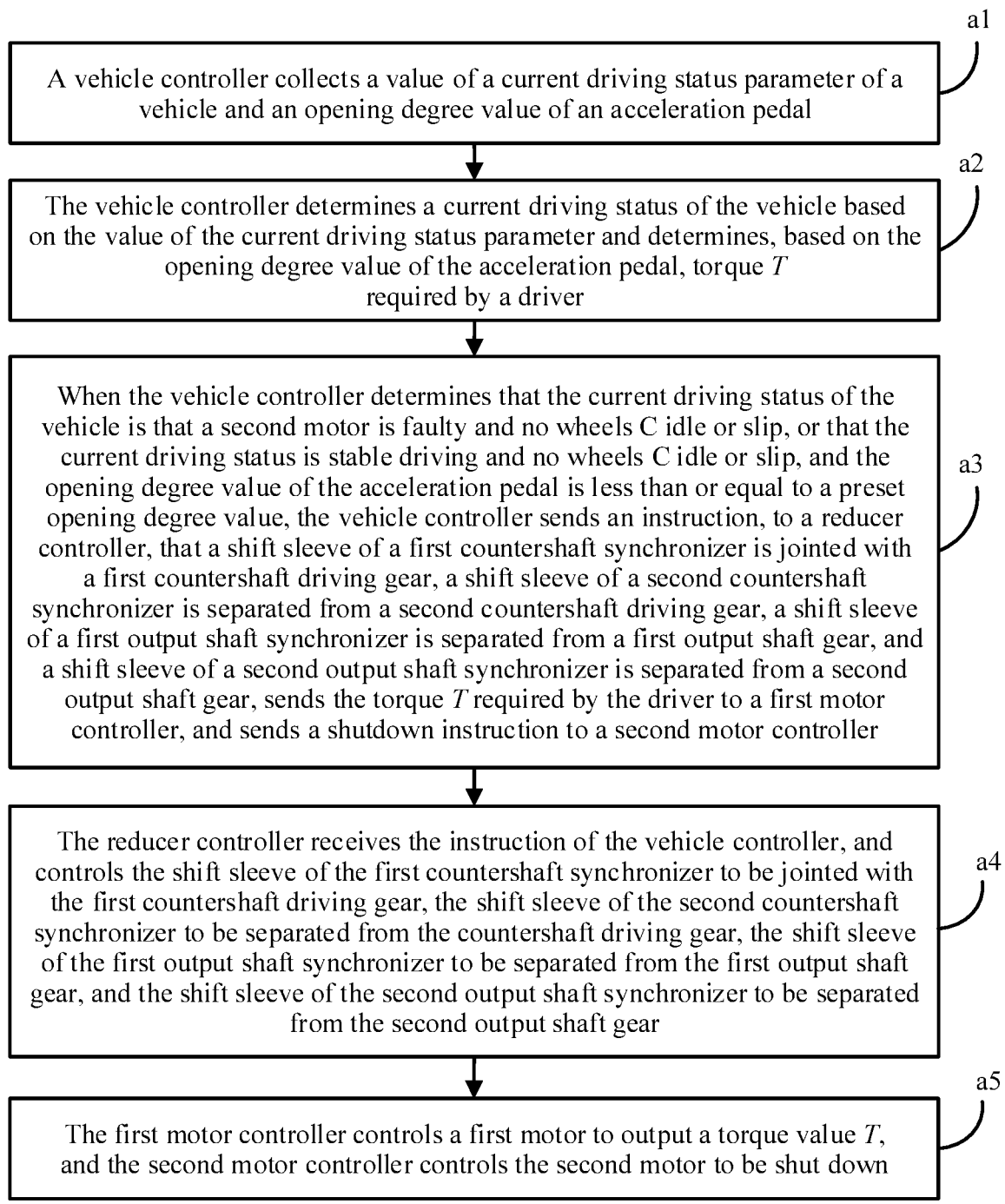
FIG. 9A is a flowchart of a control method in the single-motor centralized drive mode shown in FIG. 6A.

FIG. 9A is a flowchart of the control method in the first motor E1 centralized drive mode using the drive system using the reducer 100 shown in FIG. 2.

As shown in FIG. 9A, the control method includes the following steps.

Step a1. A vehicle controller 200 collects a value of a current driving status parameter of a vehicle and an opening degree value of an acceleration pedal.

Step a2. The vehicle controller 200 determines a current driving status of the vehicle based on the value of the current driving status parameter and determines, based on the opening degree value of the acceleration pedal, torque T required by a driver.

The vehicle controller 200 determines, according to a yaw angular velocity value, an acceleration value, and a steering wheel angle value, whether the vehicle is currently stable driving, determines, according to a wheel C rotational speed value, whether a wheel C of the vehicle currently idles or slips, and determines, according to a first motor E1 status parameter and a second motor E2 status parameter, whether the first motor E1 and the second motor E2 are faulty.

Step a3. When the vehicle controller 200 determines that the current driving status of the vehicle is that the second motor E2 is faulty and no wheels C idle or slip, or that the current driving status is stable driving and no wheels C idle or slip, and the opening degree value of the acceleration pedal is less than or equal to a preset opening degree value, the vehicle controller 200 sends an instruction, to a reducer controller 400, that the shift sleeve of the first countershaft synchronizer 7a engages with the first countershaft driving gear 61a, the shift sleeve of the second countershaft synchronizer 7b is separated from the second countershaft driving gear 61b, the shift sleeve of the first output shaft synchronizer 9a is separated from the first output shaft gear 81a, and the shift sleeve of the second output shaft synchronizer 9b is separated from the second output shaft gear 81b, sends the torque T required by the driver to a first motor controller 300a, and sends a shutdown instruction to a second motor controller 300b.

Step a4. The reducer controller 400 receives the instruction of the vehicle controller 200, and controls the shift sleeve of the first countershaft synchronizer 7a to be jointed with the first countershaft driving gear 61a, the shift sleeve of the second countershaft synchronizer 7b to be separated from the countershaft driving gear 61b, the shift sleeve of the first output shaft synchronizer 9a to be separated from the first output shaft gear 81a, and the shift sleeve of the second output shaft synchronizer 9b to be separated from the second output shaft gear 81b.

Step a5. The first motor controller 300a controls a first motor E1 to output torque value T, and the second motor controller 300b controls the second motor E2 to be shut down.

2. Control Method in a Dual-Motor Centralized Drive Mode

When the current driving status of the vehicle is that the first motor E1 and the second motor E2 are not faulty and are stable driving, no wheels C idle or slip, and the opening degree value of the acceleration pedal is greater than a preset opening degree value, the vehicle has no stability control requirement and no passability control requirement, and the driver has a comparatively high torque requirement. In this case, the drive system is controlled to enter the dual-motor centralized drive mode. In other words, power transmission between the first countershaft 2a and the centralized driving piece 5 is controlled to be connected, power transmission between the second countershaft 2b and the centralized driving piece 5 is controlled to be connected, power transmission between the first countershaft 2a and the first output shaft 3a is controlled to be disconnected, power transmission between the second countershaft 2b and the second output shaft 3b is controlled to be disconnected, the first motor E1 is controlled to output torque, and the second motor E2 is controlled to output torque.

In the dual-motor centralized drive mode, torque required by the driver is determined based on the opening degree value of the acceleration pedal, the torque required by the driver is recorded as T, and both torque output by the first motor E1 and torque output by the second motor E2 may be T/2.

The following further describes a control method in the dual-motor centralized drive mode using the drive system using the reducer 100 shown in FIG. 2 as an example.

Figure 9B:
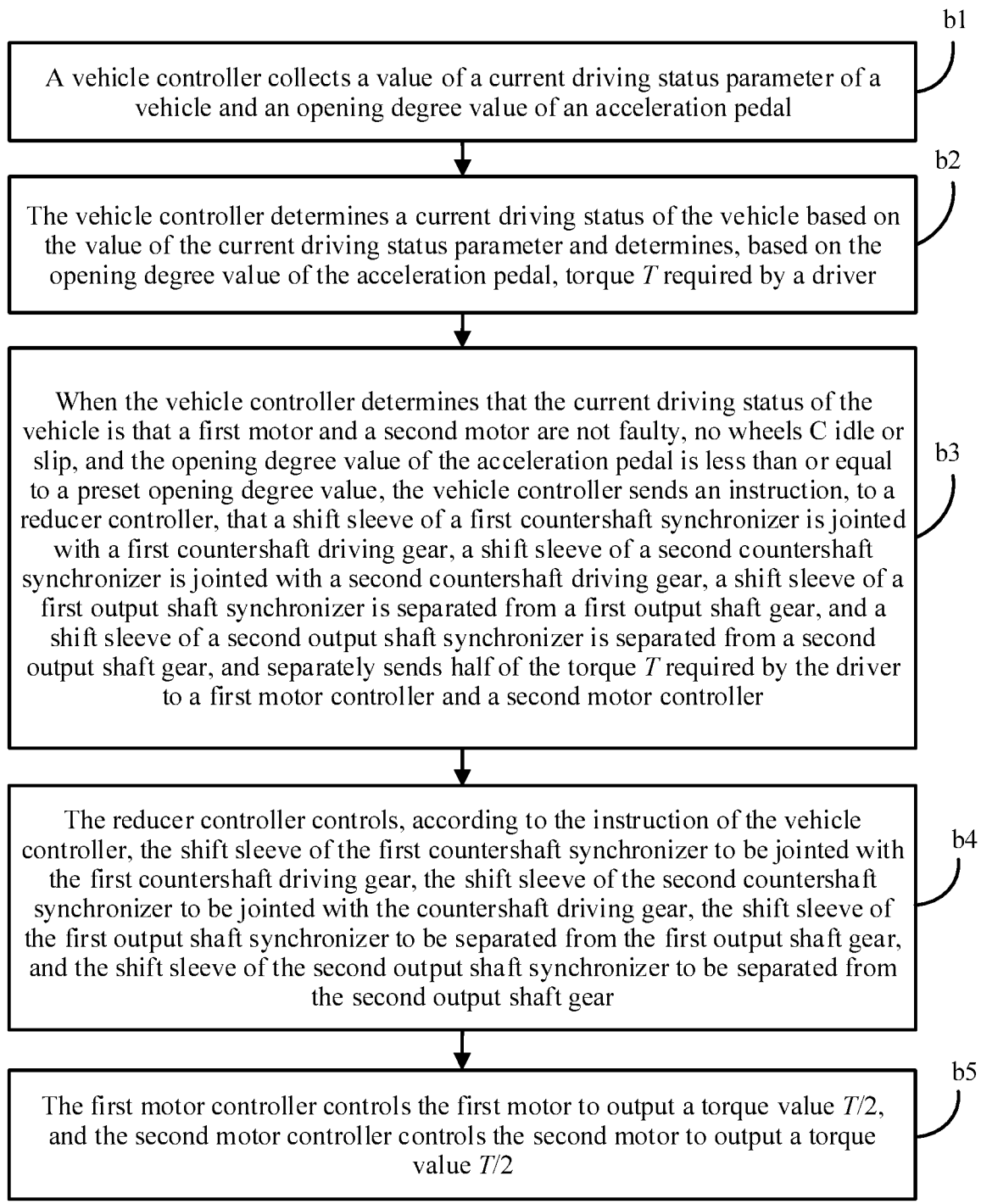
FIG. 9B is a flowchart of a control method in the dual-motor centralized drive mode shown in FIG. 6B.

FIG. 9B is a flowchart of the control method in the dual-motor centralized drive mode using the drive system using the reducer 100 shown in FIG. 2.

As shown in FIG. 9B, the control method includes the following steps.

Step b. A vehicle controller collects a value of a current driving status parameter of a vehicle and an opening degree value of an acceleration pedal.

Step b2. The vehicle controller 200 determines a current driving status of the vehicle based on the value of the current driving status parameter and determines, based on the opening degree value of the acceleration pedal, torque T required by a driver.

The vehicle controller 200 determines, according to a yaw angular velocity value, an acceleration value, and a steering wheel angle value, whether the vehicle is currently stable driving, determines, according to a wheel C rotational speed value, whether a wheel C of the vehicle currently idles or slips, and determines, according to a first motor E1 status parameter and a second motor E2 status parameter, whether the first motor E1 and the second motor E2 are faulty.

Step b3. When the vehicle controller 200 determines that the current driving status of the vehicle is that the first motor E1 and the second motor E2 are not faulty, no wheels C idle or slip, and the opening degree value of the acceleration pedal is less than or equal to a preset opening degree value, the vehicle controller 200 sends an instruction, to a reducer controller 400, that the shift sleeve of the first countershaft synchronizer 7a engages with the first countershaft driving gear 61a, the shift sleeve of the second countershaft synchronizer 7b engages with the second countershaft driving gear 61b, the shift sleeve of the first output shaft synchronizer 9a is separated from the first output shaft gear 81a, and the shift sleeve of the second output shaft synchronizer 9b is separated from the second output shaft gear 81b, and separately sends half of the torque T required by the driver to a first motor controller 300a and a second motor controller 300b.

Step b4. The reducer controller 400 controls, according to the instruction of the vehicle controller 200, the shift sleeve of the first countershaft synchronizer 7a to be jointed with the first countershaft driving gear 61a, the shift sleeve of the second countershaft synchronizer 7b to be jointed with the countershaft driving gear 61b, the shift sleeve of the first output shaft synchronizer 9a to be separated from the first output shaft gear 81a, and the shift sleeve of the second output shaft synchronizer 9b to be separated from the second output shaft gear 81b.

Step b5. The first motor controller 300a controls the first motor E1 to output a torque value T/2, and the second motor controller 300b controls the second motor E2 to output a torque value T/2.

3. Control Method in a Dual-Motor Distributed Drive Mode

When the current driving status of the vehicle is that the first motor E1 and the second motor E2 are not faulty, no wheels C idle or slip, but the vehicle is unstable, the vehicle has a stability control requirement. In this case, the drive system is controlled to enter the dual-motor distributed drive mode. In other words, power transmission between the first countershaft 2a and the centralized driving piece 5 is controlled to be disconnected, power transmission between the second countershaft 2b and the centralized driving piece 5 is controlled to be disconnected, power transmission between the first countershaft 2a and the first output shaft 3a is controlled to be connected, power transmission between the second countershaft 2b and the second output shaft 3b is controlled to be connected, the first motor E1 is controlled to output torque, and the second motor E2 is controlled to output torque.

In the dual-motor distributed drive mode, torque required by the driver is determined based on the opening degree value of the acceleration pedal, and torque requirements of the first motor E1 and the second motor E2 are determined based on the required torque and the vehicle instability status using a stability algorithm.

The following further describes a control method in the dual-motor distributed drive mode using the drive system using the reducer 100 shown in FIG. 2 as an example.

Figure 9C:
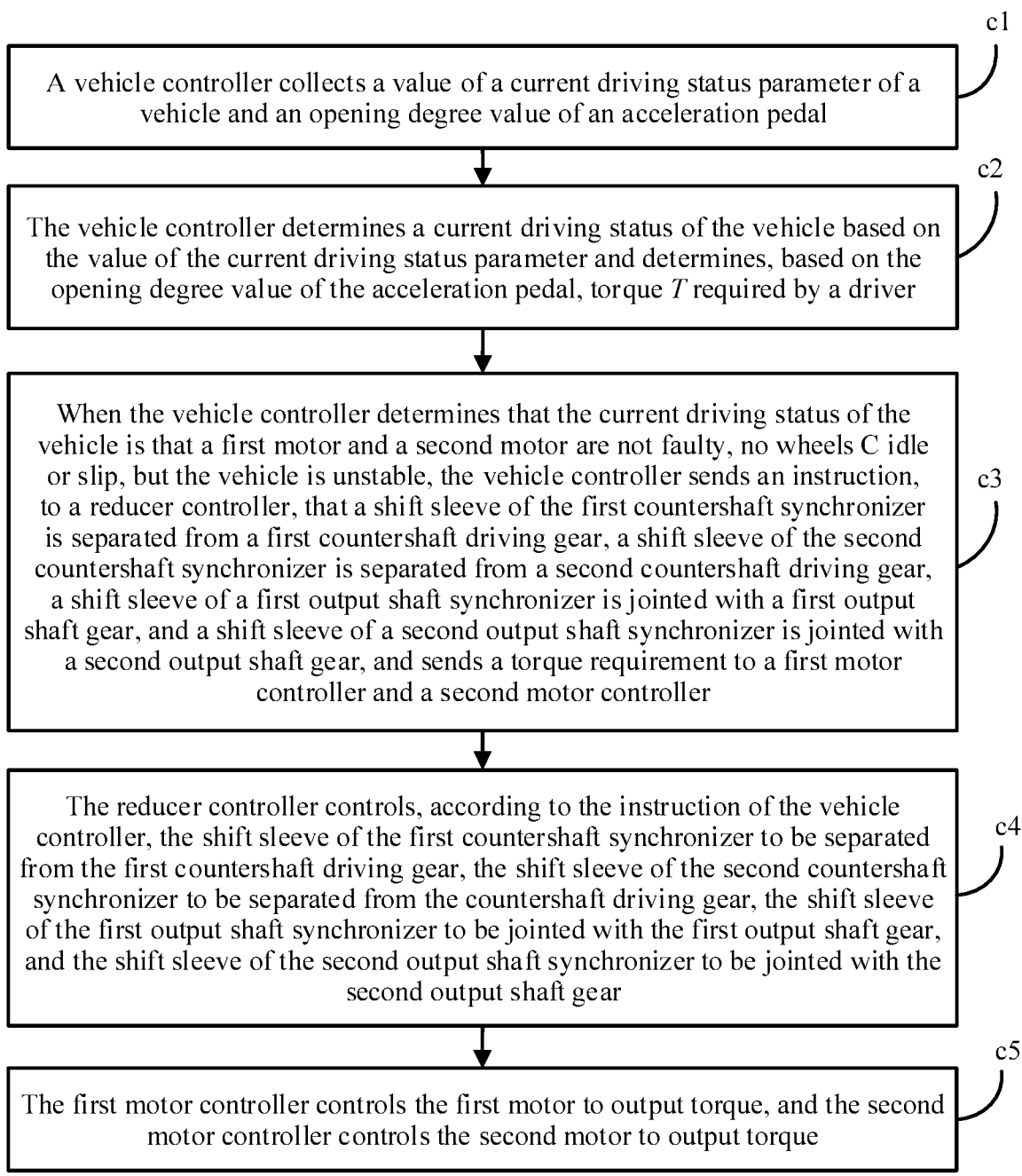
FIG. 9C is a flowchart of a control method in the dual-motor distributed drive mode shown in FIG. 6C.

FIG. 9C is a flowchart of the control method in the dual-motor distributed drive mode using the drive system using the reducer 100 shown in FIG. 2.

As shown in FIG. 9C, the control method includes the following steps.

Step c1. A vehicle controller collects a value of a current driving status parameter of a vehicle and an opening degree value of an acceleration pedal.

Step c2. The vehicle controller 200 determines a current driving status of the vehicle based on the value of the current driving status parameter and determines, based on the opening degree value of the acceleration pedal, torque T required by a driver.

The vehicle controller 200 determines, according to a yaw angular velocity value, an acceleration value, and a steering wheel angle value, whether the vehicle is currently stable driving, determines, according to a wheel C rotational speed value, whether a wheel C of the vehicle currently idles or slips, and determines, according to a first motor E1 status parameter and a second motor E2 status parameter, whether the first motor E1 and the second motor E2 are faulty.

Step c3. When the vehicle controller 200 determines that the current driving status of the vehicle is that the first motor E1 and the second motor E2 are not faulty, no wheels C idle or slip, but the vehicle is unstable, the vehicle controller 200 sends an instruction, to a reducer controller 400, that the shift sleeve of the first countershaft synchronizer 7a is separated from the first countershaft driving gear 61a, the shift sleeve of the second countershaft synchronizer 7b is separated from the second countershaft driving gear 61b, the shift sleeve of the first output shaft synchronizer 9a engages with the first output shaft gear 81a, and the shift sleeve of the second output shaft synchronizer 9b engages with the second output shaft gear 81b, and sends the torque requirement to a first motor controller 300a and a second motor controller 300b.

Step c4. The reducer controller 400 controls, according to the instruction of the vehicle controller 200, the shift sleeve of the first countershaft synchronizer 7a to be separated from the first countershaft driving gear 61a, the shift sleeve of the second countershaft synchronizer 7b to be separated from the countershaft driving gear 61b, the shift sleeve of the first output shaft synchronizer 9a to be jointed with the first output shaft gear 81a, and the shift sleeve of the second output shaft synchronizer 9b to be jointed with the second output shaft gear 81b.

Step c5. The first motor controller 300a controls the first motor E1 to output torque, and the second motor controller 300b controls the second motor E2 to output torque.

4. Control Method in Single-Motor Single-Side Drive Mode

When the current driving status of the vehicle is that the first motor E1 and the second motor E2 are not faulty, but a wheel C on one side idles or slips, and the opening degree value of the acceleration pedal is less than or equal to a preset opening degree value, the vehicle has a passability control requirement, but the driver has a comparatively low torque requirement. In this case, the drive system is controlled to enter the single-motor single-side drive mode.

When a wheel C on a right side idles or slips, power transmission between the first countershaft 2a and the centralized driving piece 5 is controlled to be disconnected, power transmission between the second countershaft 2b and the centralized driving piece 5 is controlled to be disconnected, power transmission between the first countershaft 2a and the first output shaft 3a is controlled to be connected, power transmission between the second countershaft 2b and the second output shaft 3b is controlled to be disconnected, the first motor E1 is controlled to output torque, and the second motor E2 is controlled to be shut down, to enable the drive system to enter the first motor E1 one-side drive mode, and to provide power for a wheel C on a left side.

When a wheel C on a left side idles or slips, power transmission between the first countershaft 2a and the centralized driving piece 5 is controlled to be disconnected, power transmission between the second countershaft 2b and the centralized driving piece 5 is controlled to be disconnected, power transmission between the first countershaft 2a and the first output shaft 3a is controlled to be disconnected, power transmission between the second countershaft 2b and the second output shaft 3b is controlled to be connected, the first motor E1 is controlled to be shut down, and the second motor E2 is controlled to output torque, to enable the drive system to enter the second motor E2 one-side drive mode, and to provide power for a wheel C on a right side.

In the single-motor single-side drive mode, torque required by the driver is determined based on the opening degree value of the acceleration pedal, the torque required by the driver is recorded as T, and torque output by a motor in a driving state may be T.

It may be understood that when a wheel C on one side of the vehicle idles or slips, and a motor on the same side is faulty, regardless of whether the opening degree value of the acceleration pedal is less than or equal to the preset value, the drive system needs to be controlled to enter the single-motor single-side drive mode. If a required torque corresponding to the opening degree value of the acceleration pedal is less than or equal to a maximum torque that can be output by the single motor, the motor is controlled to output the required torque, or if a required torque corresponding to the opening degree value of the acceleration pedal is greater than a maximum torque that can be output by the single motor, the motor is controlled to output the maximum torque.

The following further describes a control method in the first motor E1 one-side drive mode using the drive system using the reducer 100 shown in FIG. 2 as an example.

Figure 9D:
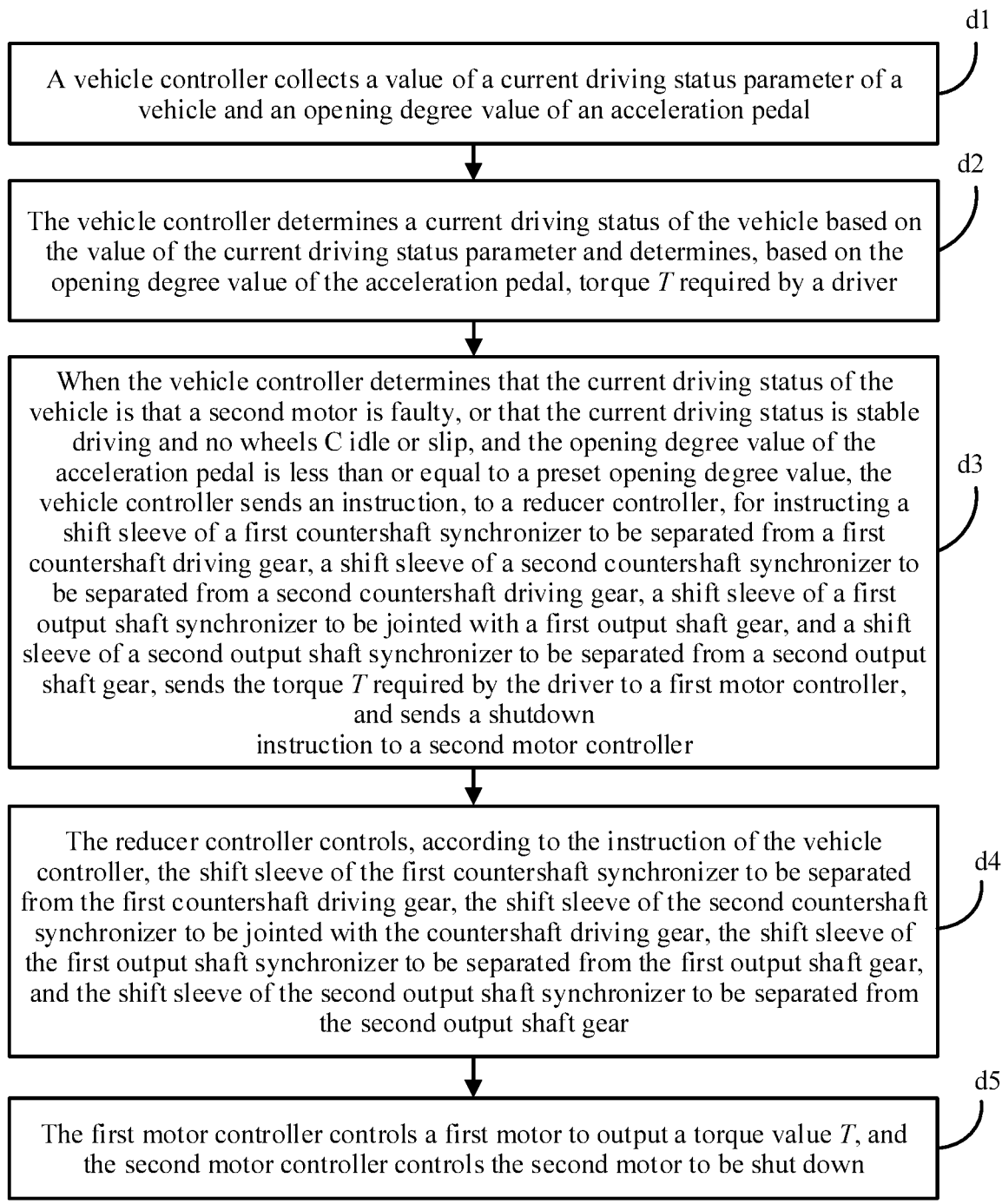
FIG. 9D is a flowchart of a control method in the single-motor single-side drive mode shown in FIG. 6D.

FIG. 9D is a flowchart of the control method in the first motor E1 single-side drive mode using the drive system using the reducer 100 shown in FIG. 2.

As shown in FIG. 9D, the control method includes the following steps.

Step d1. A vehicle controller collects a value of a current driving status parameter of a vehicle and an opening degree value of an acceleration pedal.

Step d2. The vehicle controller 200 determines a current driving status of the vehicle based on the value of the current driving status parameter and determines, based on the opening degree value of the acceleration pedal, torque T required by a driver.

The vehicle controller 200 determines, according to a yaw angular velocity value, an acceleration value, and a steering wheel angle value, whether the vehicle is currently stable driving, determines, according to a wheel C rotational speed value, whether a wheel C of the vehicle currently idles or slips, and determines, according to a first motor E1 status parameter and a second motor E2 status parameter, whether the first motor E1 and the second motor E2 are faulty.

Step d3. When the vehicle controller 200 determines that the current driving status of the vehicle is that the second motor E2 is faulty, or that the current driving status is stable driving and no wheels C idle or slip, and the opening degree value of the acceleration pedal is less than or equal to a preset opening degree value, the vehicle controller 200 sends an instruction, to a reducer controller 400, that the shift sleeve of the first countershaft synchronizer 7a is separated from the first countershaft driving gear 61a, the shift sleeve of the second countershaft synchronizer 7b is separated from the second countershaft driving gear 61b, the shift sleeve of the first output shaft synchronizer 9a engages with the first output shaft gear 81a, and the shift sleeve of the second output shaft synchronizer 9b is separated from the second output shaft gear 81b, sends the torque T required by the driver to a first motor controller 300a, and sends a shutdown instruction to a second motor controller 300b.

Step d4. The reducer controller 400 controls, according to the instruction of the vehicle controller 200, the shift sleeve of the first countershaft synchronizer 7a to be separated from the first countershaft driving gear 61a, the shift sleeve of the second countershaft synchronizer 7b to be jointed with the countershaft driving gear 61b, the shift sleeve of the first output shaft synchronizer 9a to be separated from the first output shaft gear 81a, and the shift sleeve of the second output shaft synchronizer 9b to be separated from the second output shaft gear 81b.

Step d5. The first motor controller 300a controls the first motor E1 to output a torque value T, and the second motor controller 300b controls the second motor E2 to be shut down.

5. Control Method in Wheel Lock-Up Dual-Motor Drive Mode

When the current driving status of the vehicle is that the first motor E1 and the second motor E2 are not faulty, but a wheel C on one side idles or slips, and the opening degree value of the acceleration pedal is greater than a preset opening degree value, the vehicle has a passability control requirement, and the driver has a comparatively high torque requirement. In this case, the drive system is controlled to enter the wheel lock-up dual-motor drive mode.

Power transmission between the first countershaft 2a and the centralized driving piece 5 is controlled to be connected, power transmission between the second countershaft 2b and the centralized driving piece 5 is controlled to be connected, power transmission between the first countershaft 2a and the first output shaft 3a is controlled to be connected, power transmission between the second countershaft 2b and the second output shaft 3b is controlled to be disconnected, the first motor E1 is controlled to output torque, and the second motor E2 is controlled to output torque, to enable the drive system to enter the first wheel lock-up dual-motor drive mode that is applicable to a driving situation that a wheel C on a right side idles or slips, and to provide power of a wheel C on a left side.

Power transmission between the first countershaft 2a and the centralized driving piece 5 is controlled to be connected, power transmission between the second countershaft 2b and the centralized driving piece 5 is controlled to be connected, power transmission between the first countershaft 2a and the first output shaft 3a is controlled to be disconnected, power transmission between the second countershaft 2b and the second output shaft 3b is controlled to be connected, the first motor E1 is controlled to output torque, and the second motor E2 is controlled to output torque, to enable the drive system to enter the second wheel lock-up dual-motor drive mode that is applicable to a driving situation that a wheel C on a left side idles or slips, and to provide power of a wheel C on a right side.

Power transmission between the first countershaft 2a and the centralized driving piece 5 is controlled to be connected, power transmission between the second countershaft 2b and the centralized driving piece 5 is controlled to be connected, power transmission between the first countershaft 2a and the first output shaft 3a is controlled to be connected, power transmission between the second countershaft 2b and the second output shaft 3b is controlled to be connected, the first motor E1 is controlled to output torque, and the second motor E2 is controlled to output torque, to enable the drive system to enter the second wheel lock-up dual-motor drive mode that is applicable to a driving situation that a wheel C on a left side or a right side idles or slips.

In the wheel lock-up dual-motor drive mode, torque required by the driver is determined based on the opening degree value of the acceleration pedal, the torque required by the driver is recorded as T, and both torque output by the first motor E1 and torque output by the second motor E2 may be T/2.

The following further describes a control method in the wheel lock-up dual-motor drive mode using the drive system using the reducer 100 shown in FIG. 2 as an example.

Figure 9E:
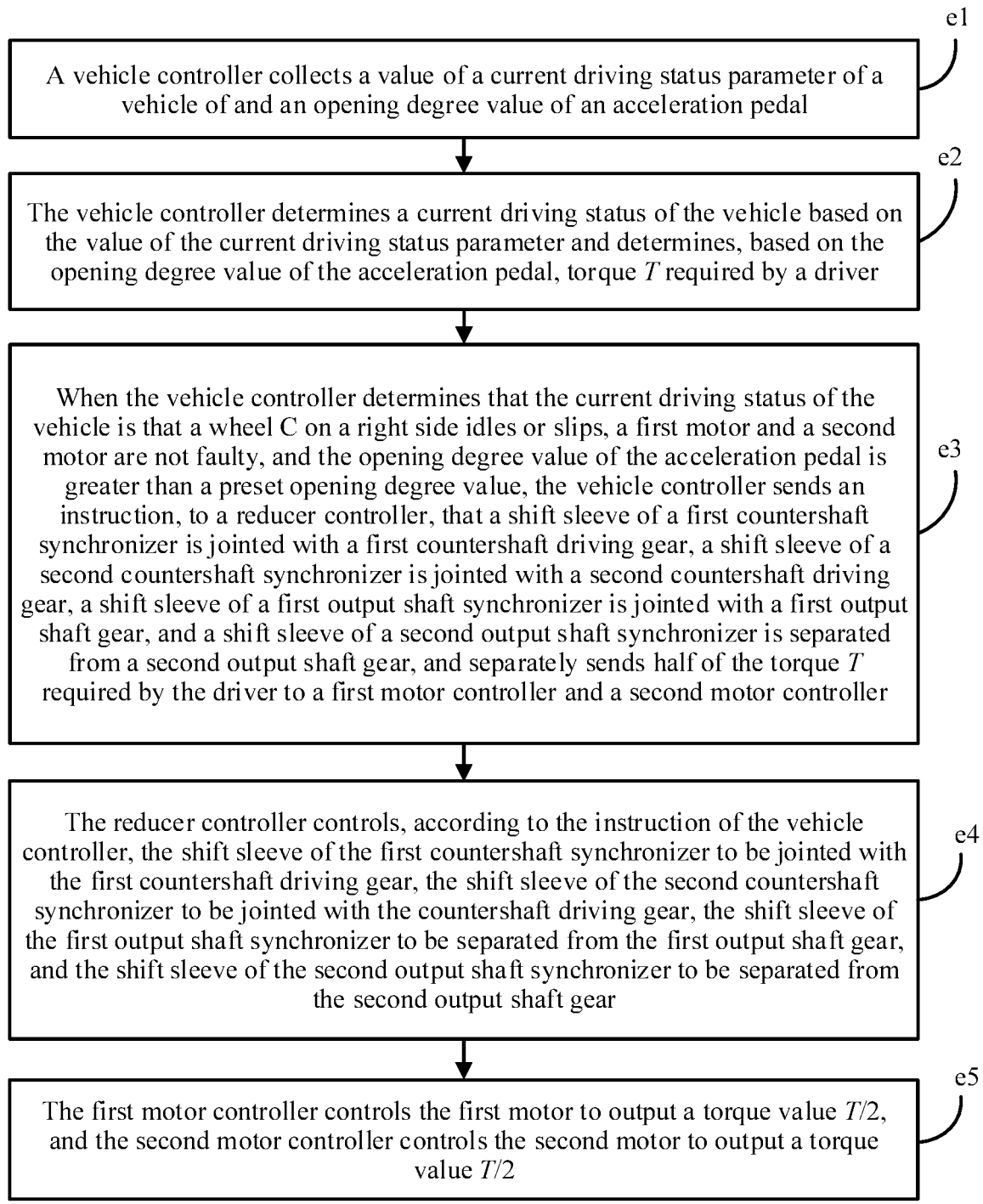
FIG. 9E is a flowchart of a control method in the first wheel lock-up dual-motor drive mode shown in FIG. 6E.

FIG. 9E is a flowchart of the control method in the first wheel lock-up dual-motor drive mode that is applicable to a driving situation that the wheel C on the right side idles or slips. Corresponding to the drive mode shown in FIG. 6E, as shown in FIG. 9E, the control method includes the following steps.

Step e1. A vehicle controller collects a value of a current driving status parameter and an opening degree value of an acceleration pedal.

Step e2. The vehicle controller 200 determines a current driving status of the vehicle based on the value of the current driving status parameter and determines, based on the opening degree value of the acceleration pedal, torque T required by a driver.

The vehicle controller 200 determines, according to a yaw angular velocity value, an acceleration value, and a steering wheel angle value, whether the vehicle is currently stable driving, determines, according to a wheel C rotational speed value, whether a wheel C of the vehicle currently idles or slips, and determines, according to a first motor E1 status parameter and a second motor E2 status parameter, whether the first motor E1 and the second motor E2 are faulty.

Step e3. When the vehicle controller 200 determines that the current driving status of the vehicle is that a wheel C on a right side idles or slips, the first motor E1 and the second motor E2 are not faulty, and the opening degree value of the acceleration pedal is greater than a preset opening degree value, the vehicle controller 200 sends an instruction, to a reducer controller 400, that the shift sleeve of the first countershaft synchronizer 7a engages with the first countershaft driving gear 61a, the shift sleeve of the second countershaft synchronizer 7b engages with the second countershaft driving gear 61b, the shift sleeve of the first output shaft synchronizer 9a engages with the first output shaft gear 81a, and the shift sleeve of the second output shaft synchronizer 9b is separated from the second output shaft gear 81b, and separately sends half of the torque T required by the driver to a first motor controller 300a and a second motor controller 300b.

Step e4. The reducer controller 400 controls, according to the instruction of the vehicle controller 200, the shift sleeve of the first countershaft synchronizer 7a to be jointed with the first countershaft driving gear 61a, the shift sleeve of the second countershaft synchronizer 7b to be jointed with the countershaft driving gear 61b, the shift sleeve of the first output shaft synchronizer 9a to be separated from the first output shaft gear 81a, and the shift sleeve of the second output shaft synchronizer 9b to be separated from the second output shaft gear 81b.

Step e5. The first motor controller 300a controls the first motor E1 to output torque value T/2, and the second motor controller 300b controls the second motor E2 to output torque value T/2.

Figure 9F:
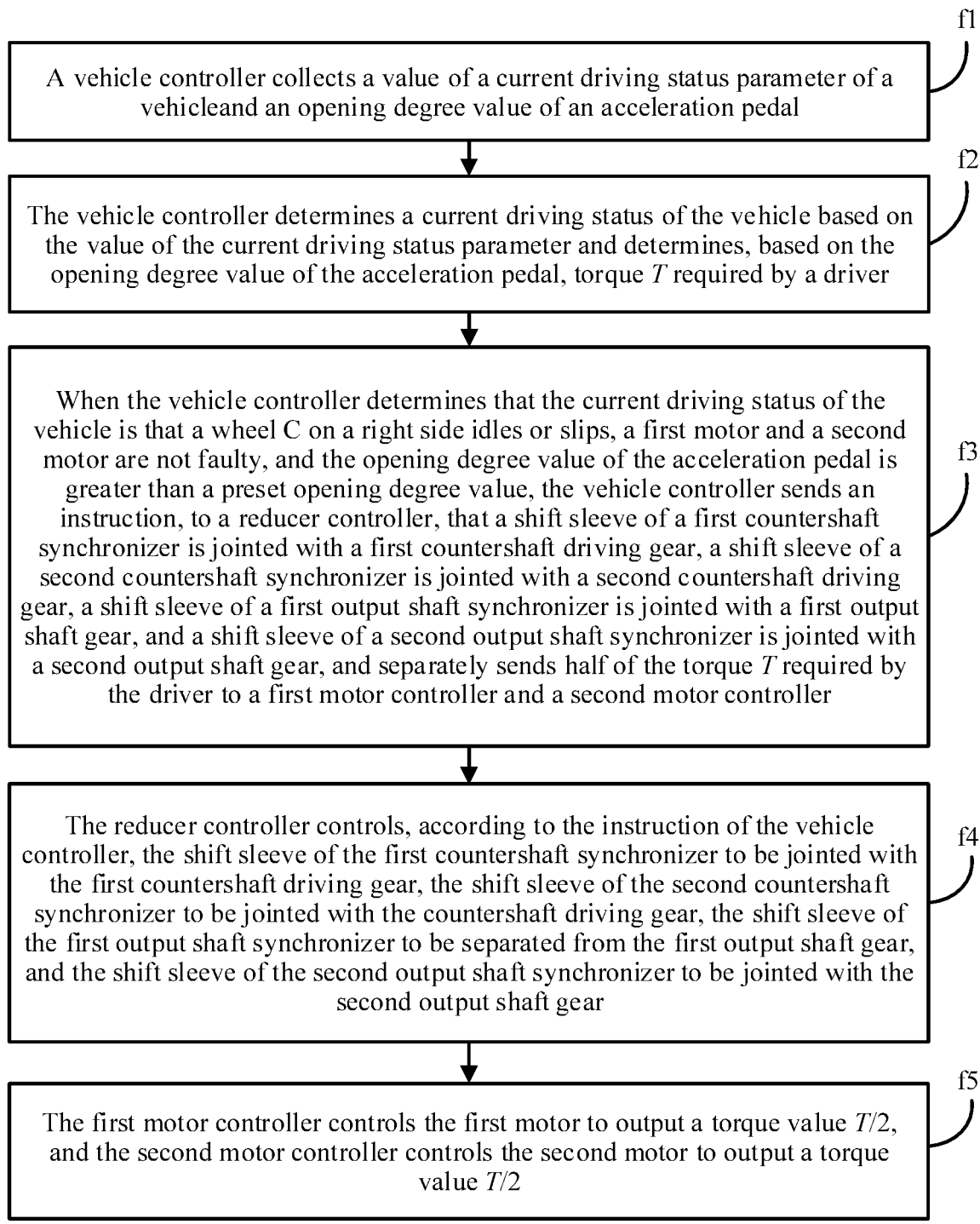
FIG. 9F is a flowchart of a control method in the second wheel lock-up dual-motor drive mode shown in FIG. 6F.

FIG. 9F is a flowchart of the control method in the second wheel lock-up dual-motor drive mode. Corresponding to the drive mode shown in FIG. 6F, as shown in FIG. 9F, the control method includes the following steps.

Step f1. A vehicle controller collects a value of a current driving status parameter of a vehicle and an opening degree value of an acceleration pedal.

Step f2. The vehicle controller 200 determines a current driving status of the vehicle based on the value of the current driving status parameter and determines, based on the opening degree value of the acceleration pedal, torque T required by a driver.

The vehicle controller 200 determines, according to a yaw angular velocity value, an acceleration value, and a steering wheel angle value, whether the vehicle is currently stable driving, determines, according to a wheel C rotational speed value, whether a wheel C of the vehicle currently idles or slips, and determines, according to a first motor E1 status parameter and a second motor E2 status parameter, whether the first motor E1 and the second motor E2 are faulty.

Step f3. When the vehicle controller 200 determines that the current driving status of the vehicle is that a wheel C on a right side idles or slips, the first motor E1 and the second motor E2 are not faulty, and the opening degree value of the acceleration pedal is greater than a preset opening degree value, the vehicle controller 200 sends an instruction, to a reducer controller 400, that the shift sleeve of the first countershaft synchronizer 7a engages with the first countershaft driving gear 61a, the shift sleeve of the second countershaft synchronizer 7b engages with the second countershaft driving gear 61b, the shift sleeve of the first output shaft synchronizer 9a engages with the first output shaft gear 81a, and the shift sleeve of the second output shaft synchronizer 9b engages with the second output shaft gear 81b, and separately sends half of the torque T required by the driver to a first motor controller 300a and a second motor controller 300b.

Step f4. The reducer controller 400 controls, according to the instruction of the vehicle controller 200, the shift sleeve of the first countershaft synchronizer 7a to be jointed with the first countershaft driving gear 61a, the shift sleeve of the second countershaft synchronizer 7b to be jointed with the countershaft driving gear 61b, the shift sleeve of the first output shaft synchronizer 9a to be separated from the first output shaft gear 81a, and the shift sleeve of the second output shaft synchronizer 9b to be jointed with the second output shaft gear 81b.

Step f5. The first motor controller 300a controls the first motor E1 to output a torque value T/2, and the second motor controller 300b controls the second motor E2 to output a torque value T/2.

6. Control Method in Wheel Lock-Up Single-Motor Drive Mode

When the current driving status of the vehicle is that a wheel C on a right side idles or slips and the first motor E1 on a left side is faulty, power transmission between the first countershaft 2a and the centralized driving piece 5 is controlled to be connected, power transmission between the second countershaft 2b and the centralized driving piece 5 is controlled to be connected, power transmission between the first countershaft 2a and the first output shaft 3a is controlled to be connected, power transmission between the second countershaft 2b and the second output shaft 3b is controlled to be disconnected (or connected), the first motor E1 is controlled to be shut down and the second motor E2 is controlled to output torque.

When the current driving status of the vehicle is that a wheel C on a left side idles or slips and the second motor E2 on a right side is faulty, power transmission between the first countershaft 2a and the centralized driving piece 5 is controlled to be connected, power transmission between the second countershaft 2b and the centralized driving piece 5 is controlled to be connected, power transmission between the first countershaft 2a and the first output shaft 3a is controlled to be disconnected (or connected), power transmission between the second countershaft 2b and the second output shaft 3b is controlled to be connected, the first motor E1 controlled to output torque and the second motor E2 is controlled to be shut down.

For the motor in the driving state, if a required torque corresponding to the opening degree value of the acceleration pedal is less than or equal to a maximum torque that can be output by the motor, the motor is controlled to output the required torque, or if a required torque corresponding to the opening degree value of the acceleration pedal is greater than a maximum torque that can be output by the motor, the motor is controlled to output the maximum torque.

The following further describes a control method in the wheel lock-up single-motor drive mode using the drive system using the reducer 100 shown in FIG. 2 as an example.

Figure 9G:
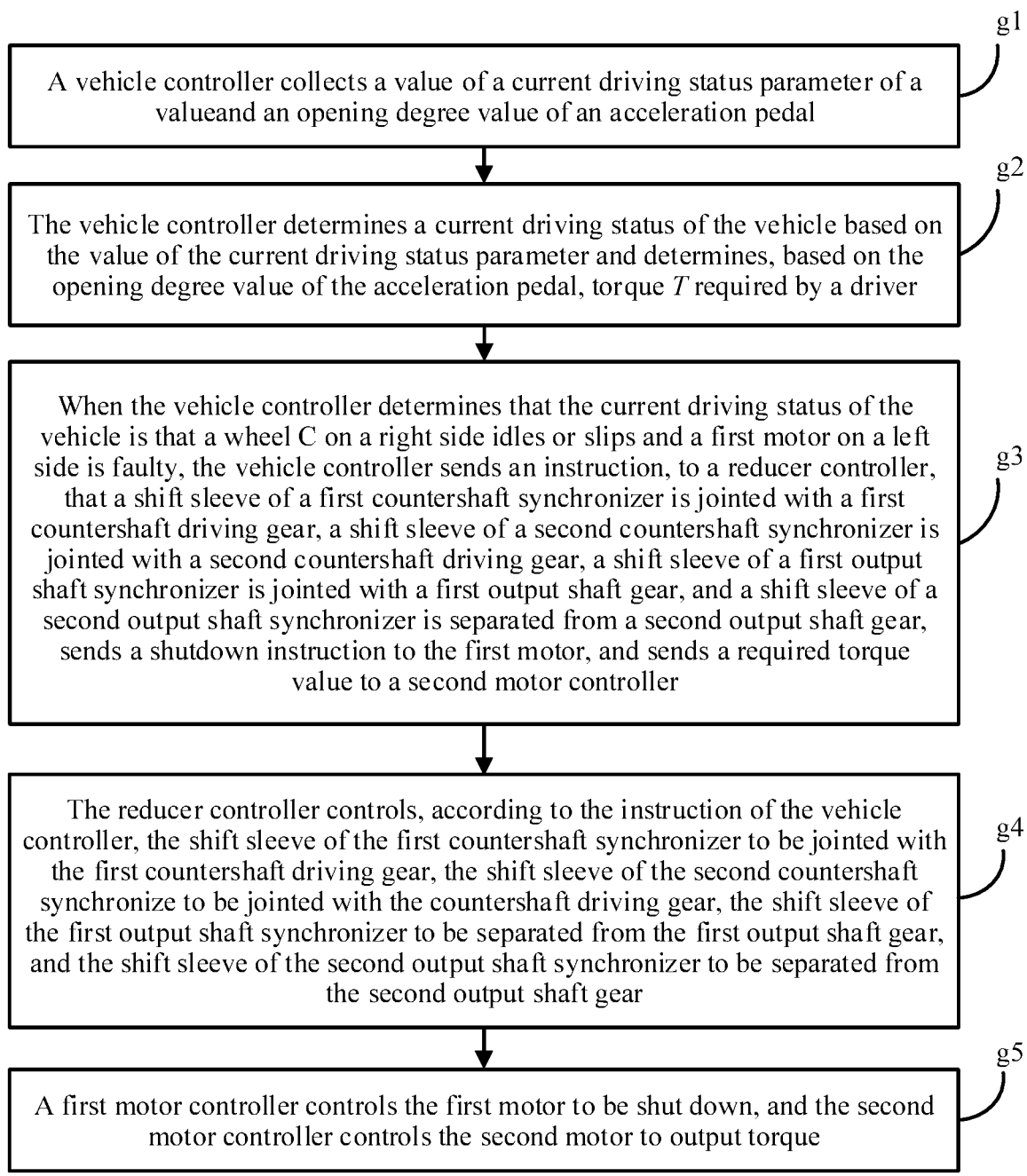
FIG. 9G is a flowchart of a control method in the wheel lock-up single-motor drive mode shown in FIG. 6G.

FIG. 9G is a flowchart of the control method in the wheel lock-up single-motor drive mode that is applicable to a driving situation that the wheel C on the right side idles or slips and the first motor E1 on the left side is faulty. Corresponding to the drive mode shown in FIG. 6G, as shown in FIG. 9G, the control method includes the following steps.

Step g1. A vehicle controller collects a value of a current driving status parameter of a vehicle and an opening degree value of an acceleration pedal.

Step g2. The vehicle controller 200 determines a current driving status of the vehicle based on the value of the current driving status parameter and determines, based on the opening degree value of the acceleration pedal, torque T required by a driver.

The vehicle controller 200 determines, according to a yaw angular velocity value, an acceleration value, and a steering wheel angle value, whether the vehicle is currently stable driving, determines, according to a wheel C rotational speed value, whether a wheel C of the vehicle currently idles or slips, and determines, according to a first motor E1 status parameter and a second motor E2 status parameter, whether the first motor E1 and the second motor E2 are faulty.

Step g3. When the vehicle controller 200 determines that the current driving status of the vehicle is that a wheel C on a right side idles or slips and the first motor E1 on the left side is faulty, the vehicle controller 200 sends an instruction, to a reducer controller 400, for instructing the shift sleeve of the first countershaft synchronizer 7a to be jointed with the first countershaft driving gear 61a, the shift sleeve of the second countershaft synchronizer 7b to be jointed with the second countershaft driving gear 61b, the shift sleeve of the first output shaft synchronizer 9a to be jointed with the first output shaft gear 81a, and the shift sleeve of the second output shaft synchronizer 9b to be separated from the second output shaft gear 81b, sends a shutdown instruction to the first motor E1, and sends a required torque value to a second motor controller 300b.

Step g4. The reducer controller 400 controls, according to the instruction of the vehicle controller 200, the shift sleeve of the first countershaft synchronizer 7a to be jointed with the first countershaft driving gear 61a, the shift sleeve of the second countershaft synchronizer 7b to be jointed with the countershaft driving gear 61b, the shift sleeve of the first output shaft synchronizer 9a to be separated from the first output shaft gear 81a, and the shift sleeve of the second output shaft synchronizer 9b to be separated from the second output shaft gear 81b.

Step g5. The first motor controller 300a controls the first motor E1 to be shut down, and the second motor controller 300b controls the second motor E2 to output torque.

Figure 10:
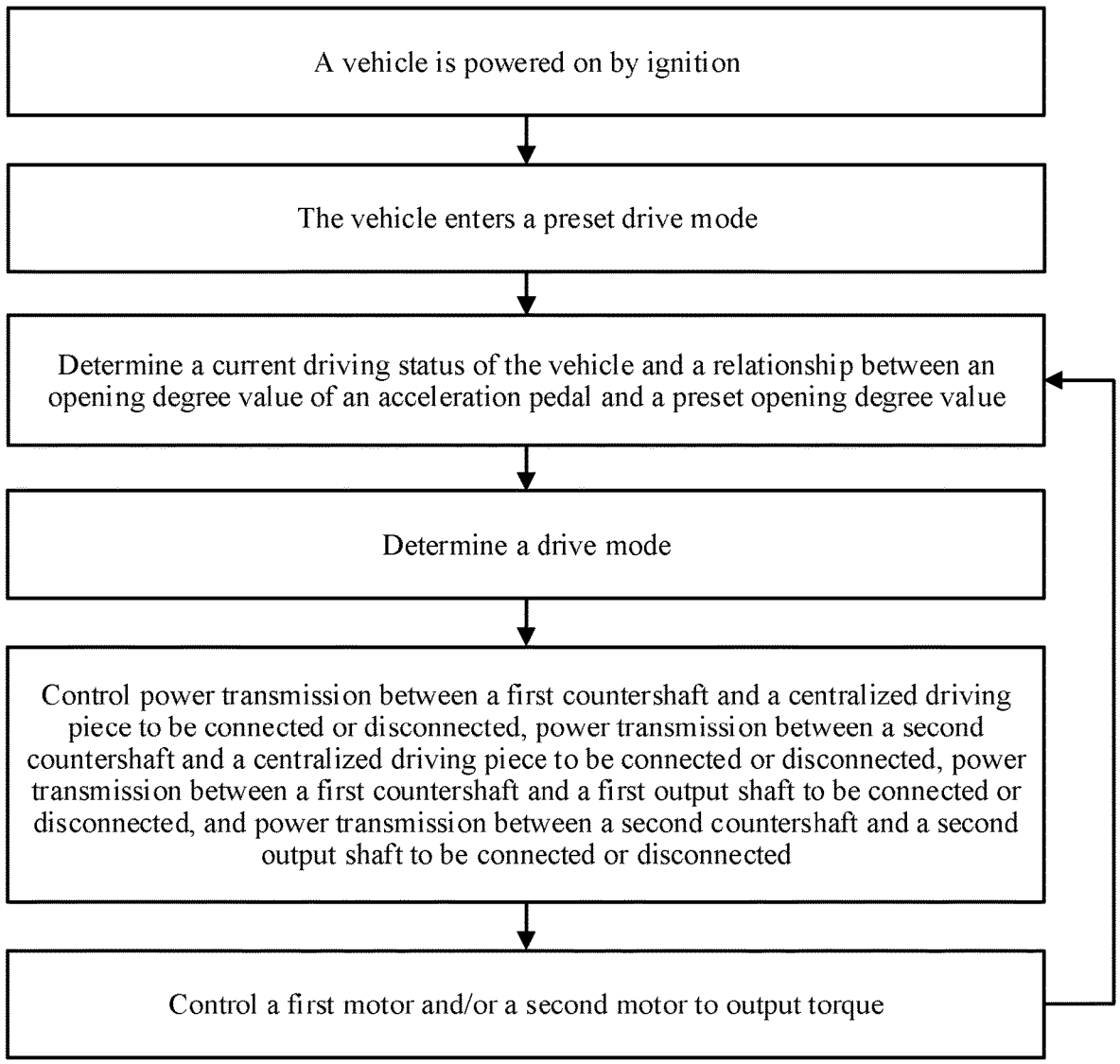
FIG. 10 is a flowchart of a control method for another electric vehicle drive system according to an embodiment of this disclosure.

FIG. 10 is a flowchart of a control method for another electric vehicle drive system according to an embodiment of this disclosure.

As shown in FIG. 10, in the control method, after the vehicle is powered on by ignition, the drive system is first enabled to enter a preset drive mode. In other words, the first motor E1, the second motor E2, power transmission between the first countershaft 2a and the centralized driving piece 5, power transmission between the second countershaft 2b and the centralized driving piece 5, power transmission between the first countershaft 2a and the first output shaft 3a, and power transmission between the second countershaft 2b and the second output shaft 3b are controlled to be in a preset status.

Then, in a driving process of the vehicle, according to the foregoing control method for the drive system, the drive system is controlled to enter a corresponding drive mode based on a current driving status of the vehicle and a relationship between an opening degree value of an acceleration pedal and a preset opening degree value.

Generally, a torque requirement is not very high when the vehicle is powered on by ignition, and there is no stability or passability control requirement. Therefore, the preset drive mode may be the single-motor centralized drive mode.

Based on the electric vehicle the drive system and the control method for the drive system, an embodiment of this disclosure further provides an electric vehicle including the drive system. The first output shaft 3a and the second output shaft 3b of the reducer 100 of the drive system are transmittingly connected to a halfshaft Y on a left side and a halfshaft Y on a right side of the vehicle respectively in order to implement a transmitting connection to the wheels C and drive the vehicle.

FIG. 11A is a schematic structural diagram of a front-wheel-driven electric vehicle according to an embodiment of this disclosure. As shown in FIG. 11A, the front-wheel-driven electric vehicle includes only a front-drive system, and the front-drive system is the drive system provided in this embodiment of this disclosure. The first output shaft 3a and the second output shaft 3b of the reducer 100 of the drive system provided in this embodiment of this disclosure are transmittingly connected to a left front wheel and a right front wheel of the vehicle respectively, and the left front wheel and the right front wheel are used as drive wheels to drive the vehicle.

A cost of the front-wheel-driven electric vehicle is comparatively low. However, because a center of gravity of the vehicle moves backward in an acceleration process, available adhesion of the front wheel is reduced, and power performance of the vehicle is affected. Therefore, the front-wheel-driven electric vehicle is applicable to a case in which a vehicle cost needs to be controlled and a vehicle power performance requirement is comparatively low.

FIG. 11B is a schematic structural diagram of a rear-wheel-driven electric vehicle according to an embodiment of this disclosure. As shown in FIG. 11B, the rear-wheel-driven electric vehicle includes only a rear-drive system, and the rear-drive system is the drive system provided in this embodiment of this disclosure. The first output shaft 3a and the second output shaft 3b of the reducer 100 of the drive system provided in this embodiment of this disclosure are transmittingly connected to a left rear wheel and a right rear wheel of the vehicle respectively, and the left rear wheel and the right rear wheel are used as drive wheels to drive the vehicle.

A cost of the rear-wheel-driven electric vehicle is higher than the cost of the front-wheel-driven electric vehicle. However, because a center of gravity of the vehicle moves backward in an acceleration process, available adhesion of the rear wheel is increased, and power performance of the vehicle is improved. Therefore, the rear-wheel-driven electric vehicle is applicable to a case in which a vehicle cost needs to be controlled and a vehicle power performance requirement is comparatively high.

FIG. 11C is a schematic structural diagram of a four-wheel-driven electric vehicle according to an embodiment of this disclosure. As shown in FIG. 11C, the four-wheel-drive electric vehicle includes both a front-drive system and a rear-drive system. The front-drive system may use the drive system provided in this embodiment of this disclosure, the rear-drive system may use the drive system provided in this embodiment of this disclosure, or both the front-drive system and the rear-drive system may use the drive system provided in this embodiment of this disclosure.

A cost of the four-wheel-driven electric vehicle is higher than the cost of the front-wheel-driven electric vehicle and the cost of the rear-wheel-driven electric vehicle. However, performance of the four-wheel-driven electric vehicle is better than that of the front-wheel-driven electric vehicle and that of the rear-wheel-driven electric vehicle in terms of power, operation stability, and the like. Therefore, the four-wheel-drive electric vehicle is applicable to a case in which a requirement for vehicle cost control is comparatively low, and a requirement for power performance and operation stability is comparatively high.

What is claimed is:

1. A reducer, comprising:
    a first input shaft;
    a second input shaft;
    a first countershaft coupled to the first input shaft;
    a second countershaft coupled to the second input shaft;
    a differential apparatus, comprising:
        a power input end;
        a first power output end; and
        a second power output end;
    a first output shaft coupled to the first power output end;
    a second output shaft coupled to the second power output end;
    a centralized driving piece coupled to the power input end;
    a first transmission assembly configured to connect and disconnect power transmission between the first countershaft and the centralized driving piece;
    a second transmission assembly configured to connect and disconnect power transmission between the second countershaft and the centralized driving piece;
    a third transmission assembly configured to connect and disconnect power transmission between the first countershaft and the first output shaft; and
    a fourth transmission assembly configured to connect and disconnect power transmission between the second countershaft and the second output shaft.

2. The reducer of claim 1, wherein the centralized driving piece comprises a centralized driving shaft located between the first countershaft and the second countershaft, and wherein the first countershaft, the centralized driving shaft, and the second countershaft are coaxial.

3. The reducer of claim 2, wherein the first transmission assembly comprises:
    a first countershaft driving gear sleeved on the first countershaft and coupled to the first countershaft, wherein the first countershaft driving gear comprises a first countershaft driving gear end face;
    a first countershaft synchronizer sleeved at one end of the centralized driving shaft and coupled to the centralized driving shaft, wherein the first countershaft synchronizer comprises a first countershaft synchronizer shift sleeve; and
    a first countershaft joint gear ring fastened on the first countershaft driving gear end face, wherein the first countershaft synchronizer shift sleeve is slidable along a shaft direction and engageable with the first countershaft joint gear ring,
    wherein the second transmission assembly comprises:
    a second countershaft driving gear sleeved on the second countershaft and coupled to the second countershaft, wherein the second countershaft driving gear comprises a second countershaft driving gear end face;
    a second countershaft synchronizer, sleeved at the other end of the centralized driving shaft and coupled to the centralized driving shaft, wherein the second countershaft synchronizer comprises a second countershaft synchronizer shift sleeve; and
    a second countershaft joint gear ring fastened on the second countershaft driving gear end face, and wherein the second countershaft synchronizer shift sleeve is slidable along a shaft direction and engageable with the second countershaft joint gear ring.

4. The reducer of claim 3, wherein the third transmission assembly comprises:
    a first output shaft gear sleeved on the first output shaft and engaging with the first countershaft driving gear, wherein the first output shaft gear comprises a first output shaft gear end face;
    a first output shaft synchronizer sleeved on the first output shaft and coupled to the first output shaft and comprising a first output shaft synchronizer shift sleeve; and
    a first output shaft joint gear ring fastened on the first output shaft gear end face, wherein the first output shaft joint gear ring is close to the first output shaft synchronizer, wherein the first output shaft synchronizer shift sleeve is slidable along a shaft direction and engageable with the first output shaft joint gear ring, and
    wherein the fourth transmission assembly comprises:
    a second output shaft gear sleeved on the second output shaft and engaged with the second countershaft driving gear;
    a second output shaft synchronizer sleeved on the second output shaft and coupled to the second output shaft, wherein the second output shaft synchronizer comprises a second output shaft synchronizer end face; and
    a second output shaft joint gear ring fastened on the second output shaft gear end face, wherein the second output shaft joint gear ring is close to the second output shaft synchronizer, and wherein the second output shaft synchronizer shift sleeve is slidable along a shaft direction and engageable with the second output shaft joint gear ring.

5. The reducer of claim 3, wherein the first countershaft synchronizer, the second countershaft synchronizer, the first output shaft synchronizer, and the second output shaft synchronizer are single-sided synchronizers.

6. The reducer of claim 2, wherein the centralized driving piece further comprises a centralized driving gear sleeved on the centralized driving shaft and is coupled to the centralized driving shaft, wherein the centralized driving shaft comprises a centralized driving shaft end face, wherein the first transmission assembly comprises:
a first countershaft driving gear sleeved on the first countershaft and coupled to the first countershaft;
a first countershaft synchronizer sleeved on the first countershaft and coupled to the first countershaft, wherein the first countershaft synchronizer comprises a first countershaft synchronizer shift sleeve; and
a first countershaft joint gear ring fastened on one side of the centralized driving gear end face, wherein the first countershaft synchronizer shift sleeve is slidable along a shaft direction and engageable with the first countershaft joint gear ring,
wherein the second transmission assembly comprises:
a second countershaft driving gear sleeved on the second countershaft and coupled to the second countershaft;
a second countershaft synchronizer sleeved on the second countershaft and coupled to the second countershaft, wherein the second countershaft synchronizer comprises a second countershaft synchronizer shift sleeve; and
a second countershaft joint gear ring fastened on another side of the centralized driving gear end face, and wherein the second countershaft synchronizer shift sleeve is slidable along a shaft direction and engageable with the second countershaft joint gear.

7. The reducer of claim 1, wherein the reducer further comprises:
a first input shaft gear sleeved on the first input shaft and coupled to the first input shaft;
a first countershaft driven gear sleeved on the first countershaft, coupled to the first countershaft and engaging with the first input shaft gear;
a second input shaft gear sleeved on the second input shaft and coupled to the second input shaft; and
a second countershaft driven gear sleeved on the second countershaft, coupled to the second countershaft, and engaging with the second input shaft gear.

8. The reducer of claim 1, wherein the differential apparatus comprises:
a housing;
a main transmission gear fastened on an outer side of the housing and coupled to the centralized driving piece, wherein the main transmission gear comprises a shaft;
a planetary gear shaft fastened inside the housing and perpendicular to the shaft of the main transmission gear;
a first planetary gear sleeved on the planetary gear shaft;
a second planetary gear sleeved on the planetary gear shaft and disposed opposite to the first planetary gear;
a first side gear located between the first planetary gear and the second planetary gear and engaging with both the first planetary gear and the second planetary gear; and
a second side gear located between the first planetary gear and the second planetary gear, disposed opposite to the first side gear, and engaging with both the first planetary gear and the second planetary gear, wherein the first output shaft passes through the housing and is coupled to the first side gear drive, and wherein the second output shaft passes through the housing and is coupled to the second side gear.

9. An electric vehicle drive system, comprising:
a first motor comprising an output shaft;
a second motor comprising an output shaft; and
a reducer, comprising:
a first input shaft coupled to the output shaft of the first motor;
a second input shaft coupled to the output shaft of the second motor;
a first countershaft coupled to the first input shaft;
a second countershaft coupled to the second input shaft;
a differential apparatus, comprising:
a power input end;
a first power output end; and
a second power output end;
a first output shaft coupled to the first power output end;
a second output shaft coupled to the second power output end;
a centralized driving piece coupled to the power input end;
a first transmission assembly configured to connect and disconnect a power transmission between the first countershaft and the centralized driving piece;
a second transmission assembly configured to connect and disconnect the power transmission between the second countershaft and the centralized driving piece;
a third transmission assembly configured to connect and disconnect the power transmission between the first countershaft and the first output shaft; and
a fourth transmission assembly configured to connect and disconnect the power transmission between the second countershaft and the second output shaft.

10. The electric vehicle drive system of claim 9, wherein a drive mode of the drive system comprises a single-motor centralized drive mode, and wherein when the electric vehicle drive system is in the single-motor centralized drive mode, the first motor is in a driving state, the second motor is in a shutdown state, the power transmission between the first countershaft and the centralized driving piece is connected, the power transmission between the second countershaft and the centralized driving piece is disconnected, the power transmission between the first countershaft and the first output shaft is disconnected, and the power transmission between the second countershaft and the second output shaft is disconnected.

11. The electric vehicle drive system of claim 9, wherein a drive mode of the drive system comprises a dual-motor centralized drive mode, and wherein when the electric vehicle drive system is in the dual-motor centralized drive mode, the first motor is in a driving state, the second motor is in a driving state, the power transmission between the first countershaft and the centralized driving piece is connected, the power transmission between the second countershaft and the centralized driving piece is connected, the power transmission between the first countershaft and the first output shaft is disconnected, and the power transmission between the second countershaft and the second output shaft is disconnected.

12. The electric vehicle drive system of claim 9, wherein a drive mode of the drive system comprises a dual-motor distributed drive mode, and wherein when the electric vehicle drive system is in the dual-motor distributed drive mode, the first motor is in a driving state, the second motor is in a driving state, the power transmission between the first countershaft and the centralized driving piece is disconnected, the power transmission between the second countershaft and the centralized driving piece is disconnected, the power transmission between the first countershaft and the first output shaft is connected, and the power transmission between the second countershaft and the second output shaft is connected.

13. The electric vehicle drive system of claim 9, wherein a drive mode of the electric vehicle drive system comprises a single-motor single-side drive mode, and wherein when the electric vehicle drive system is in the single-motor single-side drive mode, the first motor is in a driving state, the second motor is in a shutdown state, the power transmission between the first countershaft and the centralized driving piece is disconnected, the power transmission between the second countershaft and the centralized driving piece is disconnected, the power transmission between the first countershaft and the first output shaft is connected, and the power transmission between the second countershaft and the second output shaft is disconnected.

14. The electric vehicle drive system of claim 9, wherein a drive mode of the electric vehicle drive system comprises a first wheel lock-up dual-motor drive mode, and wherein when the electric vehicle drive system is in the first wheel lock-up dual-motor drive mode, the first motor is in a driving state, the second motor is in a driving state, the power transmission between the first countershaft and the centralized driving piece is connected, the power transmission between the second countershaft and the centralized driving piece is connected, the power transmission between the first countershaft and the first output shaft is connected, and the power transmission between the second countershaft and the second output shaft is disconnected, or when the first motor is in a driving state, the second motor is in a driving state, the power transmission between the first countershaft and the centralized driving piece is connected, the power transmission between the second countershaft and the centralized driving piece is connected, the power transmission between the first countershaft and the first output shaft is disconnected, and the power transmission between the second countershaft and the second output shaft is connected.

15. The electric vehicle drive system of claim 9, wherein a drive mode of the electric vehicle drive system comprises a second wheel lock-up dual-motor drive mode, and when the electric vehicle drive system is in the second wheel lock-up dual-motor drive mode, the first motor is in a driving state, the second motor is in a driving state, the power transmission between the first countershaft and the centralized driving piece is connected, the power transmission between the second countershaft and the centralized driving piece is connected, the power transmission between the first countershaft and the first output shaft is connected, and the power transmission between the second countershaft and the second output shaft is connected.

16. The electric vehicle drive system of claim 9, further comprising:
a vehicle controller;
a reducer controller electrically coupled to the vehicle controller;
a first motor controller electrically coupled to the first motor and the vehicle controller;
a second motor controller electrically coupled to the second motor and the vehicle controller; and
a power battery electrically coupled to the first motor controller, the second motor controller, and the vehicle controller.

17. An electric vehicle, comprising:
an electric vehicle drive system, wherein the electric vehicle drive system comprises:
a first motor comprising a first motor output shaft;
a second motor comprising a second motor output shaft;
a front-drive system or a rear-drive system; and
a reducer, comprising:
a first input shaft coupled to the first motor output shaft;
a second input shaft coupled to the second motor output shaft;
a first countershaft coupled to the first input shaft;
a second countershaft coupled to the second input shaft; and
a differential apparatus, comprising:
a power input end;
a first power output end; and
a second power output end;
a first output shaft coupled to the first power output end;
a second output shaft coupled to the second power output end;
a centralized driving piece coupled to the power input end;
a first transmission assembly configured to connect and disconnect power transmission between the first countershaft and the centralized driving piece;
a second transmission assembly configured to connect and disconnect power transmission between the second countershaft and the centralized driving piece;
a third transmission assembly configured to connect and disconnect power transmission between the first countershaft and the first output shaft; and
a fourth transmission assembly configured to connect and disconnect power transmission between the second countershaft and the second output shaft.

18. The electric vehicle of claim 17, wherein the electric vehicle comprises a front-drive system and a rear-drive system, and wherein at least one of the front-drive system or the rear-drive system is the electric vehicle drive system.

19. The electric vehicle drive system of claim 9, wherein a drive mode of the electric vehicle drive system comprises a single-motor centralized drive mode, and wherein when the first motor is in a shutdown state, the second motor is in a driving state, the power transmission between the first countershaft and the centralized driving piece is disconnected, the power transmission between the second countershaft and the centralized driving piece is connected, the power transmission between the first countershaft and the first output shaft is disconnected, and the power transmission between the second countershaft and the second output shaft is disconnected.

20. The electric vehicle drive system of claim 9, wherein a drive mode of the electric vehicle drive system comprises a single-motor single-side drive mode, and wherein when the first motor is in a shutdown state, the second motor is in a driving state, the power transmission between the first countershaft and the centralized driving piece is disconnected, the power transmission between the second countershaft and the centralized driving piece is disconnected, the power transmission between the first countershaft and the first output shaft is disconnected, and the power transmission between the second countershaft and the second output shaft is connected.

* * * * *